(12) United States Patent
Omoto et al.

(10) Patent No.: US 8,823,206 B2
(45) Date of Patent: Sep. 2, 2014

(54) POWER-SUPPLY CONTROL DEVICE

(75) Inventors: Yasumichi Omoto, Aichi (JP); Yusaku Ido, Aichi (JP); Koji Hachiya, Aichi (JP)

(73) Assignee: Omron Automotive Electronics Co., Ltd., Aichi (JP)

( * ) Notice: Subject to any disclaimer, the term of this patent is extended or adjusted under 35 U.S.C. 154(b) by 557 days.

(21) Appl. No.: 13/221,954

(22) Filed: Aug. 31, 2011

(65) Prior Publication Data

US 2012/0056478 A1 Mar. 8, 2012

(30) Foreign Application Priority Data

Sep. 2, 2010 (JP) ................................ 2010-196376

(51) Int. Cl.
*B60L 1/00* (2006.01)
(52) U.S. Cl.
USPC ......................................................... 307/9.1
(58) Field of Classification Search
USPC ........................................................... 307/9.1
See application file for complete search history.

(56) References Cited

U.S. PATENT DOCUMENTS

| 7,764,044 B2 | 7/2010 | Ishikawa et al. |
|---|---|---|
| 2004/0130214 A1 | 7/2004 | Murty et al. |
| 2008/0072859 A1 | 3/2008 | Esaka et al. |
| 2009/0001926 A1 | 1/2009 | Sato |
| 2010/0087976 A1 | 4/2010 | Aridome et al. |
| 2010/0296204 A1 | 11/2010 | Ichikawa et al. |
| 2013/0099594 A1 | 4/2013 | Ichikawa et al. |
| 2013/0099595 A1 | 4/2013 | Ichikawa et al. |
| 2013/0099596 A1 | 4/2013 | Ichikawa et al. |

FOREIGN PATENT DOCUMENTS

| CN | 101389505 A | 3/2009 |
|---|---|---|
| CN | 101399543 A | 4/2009 |
| CN | 101542880 A | 9/2009 |
| JP | 2003-267163 A | 9/2003 |
| JP | 2005287242 A | 10/2005 |
| JP | 2006-50779 | 2/2006 |
| JP | 2006174619 A | 6/2006 |
| JP | 2006-304394 A | 11/2006 |
| JP | 2007028803 A | 2/2007 |
| JP | 2008-149897 A | 7/2008 |

OTHER PUBLICATIONS

Extended European Search Report issued in corresponding European Application No. 11177416.2, mailed Nov. 5, 2013 (11 pages).
Office Action issued in corresponding Japanese Application No. 2010-196376, mailed Oct. 24, 2013 (12 pages).
Chinese Office Action Issued in Chinese Application No. 201110252796.0, Dated: Aug. 30, 2013 (13 Pages With English Translation).
English Patent Abstract of JP 2005-287242 {1 Page}.
English Patent Abstract of JP 2007-028803 {1 Page}.
English Patent Abstract of JP 2006-174619 {1 Page}.

*Primary Examiner* — Robert L. Deberadinis
(74) *Attorney, Agent, or Firm* — Osha Liang LLP

(57) ABSTRACT

A power-supply control device for battery having a plurality of cells connected in series has a voltage conversion unit that steps down a voltage at the battery to supply the stepped-down voltage to a first load, a first opening and closing unit that opens and closes a supply path of first power from the battery to the voltage conversion unit and a second load, a battery control unit that detects abnormality of the battery, controls opening and closing of the first opening and closing unit, and is operated by second power supplied from the battery or third power supplied from the voltage conversion unit, the second power being lower than the first power, and a second opening and closing unit that opens and closes a supply path of the second power from the battery to the battery control unit.

6 Claims, 15 Drawing Sheets

POWER-SUPPLY CONTROL DEVICE

BACKGROUND OF THE INVENTION

1. Technical Field

The present invention relates to a power-supply control device, and particularly relates to a power-supply control device that is suitably used to control a power supply of an electric-powered vehicle.

2. Related Art

Two types of batteries, namely, a high-voltage battery and a low-voltage battery are usually provided in an electric-powered vehicle such as an EV (Electric Vehicle), an HEV (Hybrid Electric Vehicle), or a PHEV (Plug-in Hybrid Electric Vehicle).

The high-voltage battery is mainly used as a power supply for a load of a high voltage (hereinafter, referred to as a high-voltage load) such as a main power motor for driving wheels of the electric-powered vehicle to travel and a compressor motor of an air conditioner.

On the other hand, the low-voltage battery is mainly used as a power supply for a load of a low voltage (hereinafter, referred to as a low-voltage load) such as various ECUs (Electronic Control Units) that control units of the electric-powered vehicle, EPSs (Electric Power Steerings), electric brakes, car audio devices, windshield wipers, and power windows, and an illumination lamp.

For example, in order to charge the low-voltage battery, a DC-DC converter transforms the voltage of the high-voltage battery and supplies the voltage to the low-voltage battery.

When a remaining amount of the low-voltage battery becomes a predetermined value or less because the electric-powered vehicle is left for a long time, that is, when so-called battery run-out has occurred, a control system of the electric-powered vehicle cannot be operated irrespective of the remaining amount of the high-voltage battery, and therefore the electric-powered vehicle cannot be started.

Therefore, in order to prevent the run-out of the low-voltage battery in the case of leaving the HEV for a long time, there is proposed that the charge is performed from the high-voltage battery to the low-voltage battery at regular time intervals while an ignition switch is turned off (for example, see Japanese Unexamined Patent Publication No. 2006-174619).

There is also proposed that the high-voltage battery is directly connected to an input of a DC-DC converter control circuit that controls the DC-DC converter without interposing a relay, the DC-DC converter is started up to be able to charge the low-voltage battery even if the low-voltage battery has run out (for example, see Japanese Unexamined Patent Publication No. 2006-50779).

A control device of the electric-powered vehicle includes the high-voltage battery, a booster that boosts up the voltage of the high-voltage battery to output the voltage onto a generator motor side, a step-down device that steps down the voltage supplied from the generator motor or the high-voltage battery to supply the voltage to the low-voltage battery, a first switch that is provided in one of positive and negative electrodes of the high-voltage battery, and a second switch that is provided in the other of the positive and negative electrodes. In the control device, a power supply line for the step-down device is connected between the first switch and the booster and between the second switch and the high-voltage battery. There is also proposed that the run-out of the low-voltage battery is prevented such that, when the generator motor breaks down, the low-voltage battery is continuously charged by the high-voltage battery through the step-down device while the step-down device is protected by turning off the first switch and such that, when the high-voltage battery breaks down, the low-voltage battery is continuously charged by the generator motor through the step-down device while the step-down device is protected by turning off the second switch (for example, see Japanese Unexamined Patent Publication No. 2007-28803).

There is also proposed a vehicle power supply that supplies the power to a low-voltage system through the DC-DC converter while supplying the power to a high-voltage system from the high-voltage battery, in which a capacitor is charged when a relay switch that opens and closes connection among the high-voltage battery, the high-voltage system and the DC-DC converter, and the relay switch is turned on to be able to start up the high-voltage system and the low-voltage system using the power of the capacitor when the ignition switch is turned on, thereby eliminating the low-voltage battery (for example, see Japanese Unexamined Patent Publication No. 2005-287242).

In starting the supply of the power from the high-voltage battery to each load, when abnormalities are generated in the high-voltage battery, a voltage equal to or more than a rated voltage may be applied to each load including the DC-DC converter, thereby causing breakdown.

SUMMARY

A power-supply control device according to one or more embodiments of the present invention prevents breakdown of each load due to abnormalities of a high-voltage battery in starting supply of power from the high-voltage battery to each load.

In accordance with one or more embodiments of the present invention, there is provided a power-supply control device including: a voltage conversion unit that steps down a voltage at a battery to supply the stepped-down voltage to a first load, the battery to which a plurality of cells are connected in series; a first opening and closing unit that opens and closes a supply path of first power from the battery to the voltage conversion unit and a second load; a battery control unit that detects abnormality of the battery, controls opening and closing of the first opening and closing unit, and is operated by second power supplied from the battery or third power supplied from the voltage conversion unit, the second power being lower than the first power; and a second opening and closing unit that opens and closes a supply path of the second power from the battery to the battery control unit, wherein the battery control unit controls opening and closing of the second opening and closing unit, the battery control unit opens the first opening and closing unit and detects the abnormality of the battery while closing the second opening and closing unit when the supply of the first power from the battery to the voltage conversion unit and the second load is started, the battery control unit closes the first opening and closing unit while opening the second opening and closing unit when the abnormality of the battery is not detected, and the battery control unit continuously opens the first opening and closing unit when the abnormality of the battery is detected.

In the power-supply control device of one or more embodiments of the present invention, the first opening and closing unit is opened and the abnormality of the battery is detected while the second opening and closing unit is closed when the supply of the first power from the battery to the voltage conversion unit and the second load is started, the first opening and closing unit is closed while the second opening and closing unit is opened when the abnormality of the battery is not detected, and the first opening and closing unit is continuously opened when the abnormality of the battery is detected.

Accordingly, before the supply of the power from the battery to each load is started, confirmation that the abnormality of the battery is not generated can be made before supplying the power to each load. As a result, a breakdown of the load caused by the abnormality of the battery can be prevented in starting the supply of the power from the battery.

For example, the voltage conversion unit includes a DC-DC converter. For example, the battery control unit includes an ECU. For example, the first opening and closing unit and the second opening and closing unit include a relay, a switch, and the like.

The second power may be supplied from some of the cells of the battery.

A changing unit that changes the cells of the battery supplying the second power may further be provided.

Therefore, the variation in charge amount of the battery cell can be decreased.

For example, the changing unit includes a switch, a relay, and a transistor.

A capacitor unit that is located between the second opening and closing unit and the battery control unit and charged by the second power may further be provided. In starting the supply of the first power from the battery to the voltage conversion unit and the second load, the battery control unit may open the second opening and closing unit to close the first opening and closing unit when the abnormality of the battery is not detected.

Therefore, even if the first opening and closing unit is closed after the second opening and closing unit is opened, the power can continuously be supplied to the battery control unit to stably operate the battery control unit.

For example, the capacitor unit includes a capacitor, an electric double layer capacitor, and a secondary battery.

The battery includes a plurality of cell groups having the same number of series-connected cells, and the power-supply control device further includes a changing unit that changes series connection and parallel connection among the plural cell groups, and the second power may be supplied from the plurality of parallel-connected cell groups.

Therefore, the cells of the battery can equally be used to further decrease the variation in charge amount of each cell.

For example, the changing unit includes a switch, a relay, and a transistor.

In starting the supply of the first power from the battery to the voltage conversion unit and the second load, when the abnormality of the battery is not detected, the battery control unit closes the first opening and closing unit, and the battery control unit may open the second opening and closing unit after a signal indicating start of the supply of the third power is supplied from the voltage conversion unit.

Therefore, the power can more stably be supplied to the voltage conversion unit.

According to one or more embodiments of the present invention, before the supply of the power from the battery to each load is started, the confirmation that the abnormality of the battery is not generated can be made before starting the supply of the power to each load. As a result, the breakdown of the load caused by the abnormality of the battery can be prevented at the start of the supply of the power from the battery.

DETAILED DESCRIPTION

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. The description will be made in the following order.

1. First embodiment (basic configuration)
2. Second embodiment (configuration in which capacitor is removed from basic configuration)
3. Third embodiment (configuration in which battery cell to be used is changed)
4. Fourth embodiment (configuration in which connection of battery cell is changed between series and parallel)
5. Modifications of embodiments 1. Embodiments A first embodiment of the present invention will be described with reference to FIGS. 1 to 4.

[Configuration Example of Power-Supply Control System 101]

Figure 1:
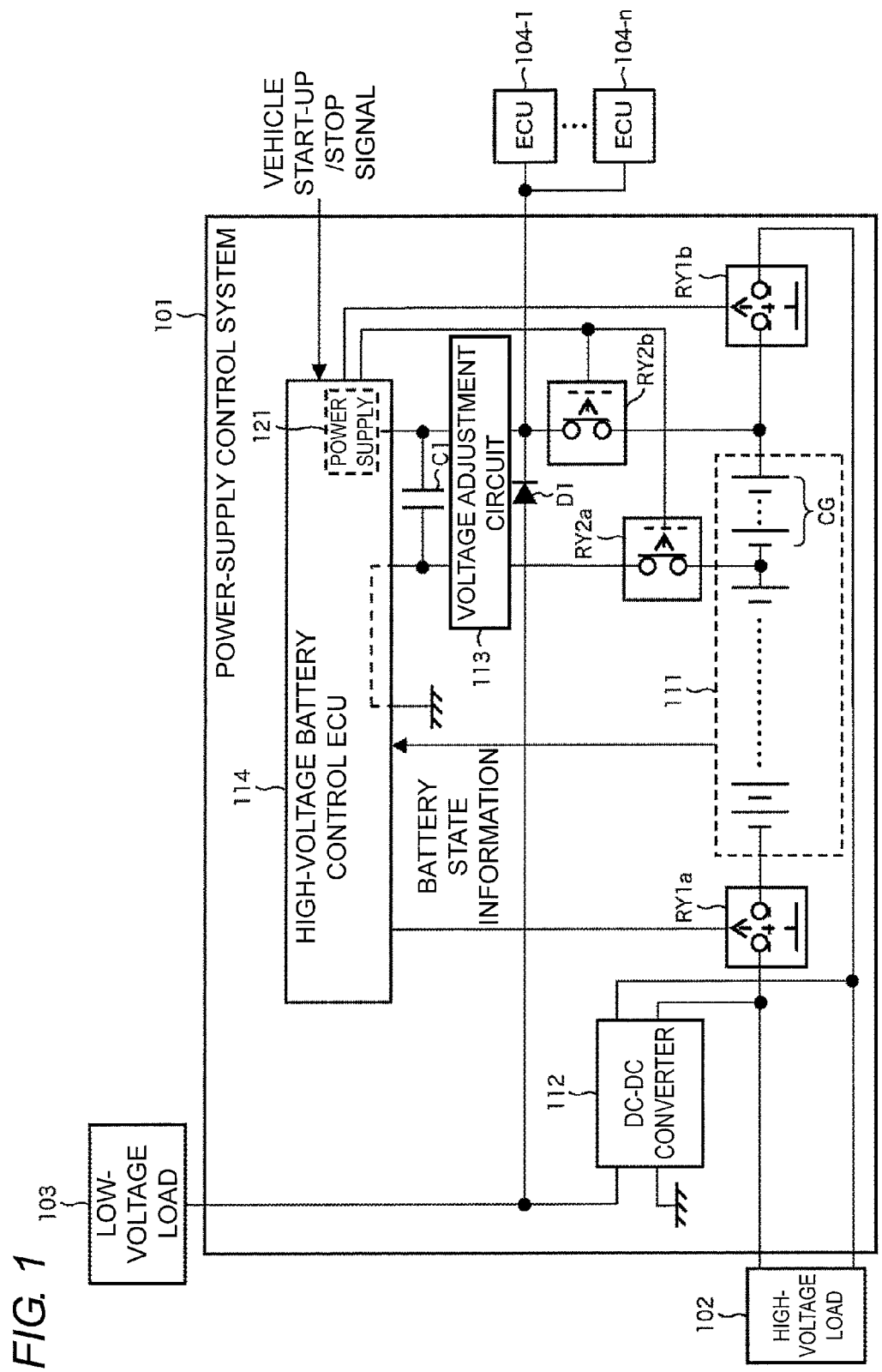
FIG. 1 is a circuit diagram illustrating a power-supply control system according to a first embodiment of the present invention.

FIG. 1 is a circuit diagram illustrating a power-supply control system of the first embodiment of the present invention. A power-supply control system 101 is provided in an electric-powered vehicle. The power-supply control system 101 controls supply of power to a high-voltage load 102, a low-voltage load 103 and n ECUs 104-1 to 104-n, which are provided in the electric-powered vehicle, from a high-voltage battery 111.

For example, the high-voltage load 102 includes a main power motor of the electric-powered vehicle and a compressor motor of an air conditioner.

For example, the low-voltage load 103 includes an ECU, an EPS, an electric brake, a car audio device, a windshield wiper, a power window motor and an illumination lamp, which need not be operated while the electric-powered vehicle is stopped.

The ECUs 104-1 to 104-n include ECUs, such as an accessory system, which need to be operated while the electric-powered vehicle is stopped. Hereinafter, the ECUs 104-1 to 104-n are simply referred to as ECU 104 when the ECUs need not be distinguished from one another.

The power-supply control system 101 includes a high-voltage battery 111, a DC-DC converter 112, a voltage adjustment circuit 113, a high-voltage battery control ECU (Electronic Control Unit) 114, relays RY1a to RY2b, a diode D1 and a capacitor C1.

The high-voltage battery 111 is a so-called assembled battery that includes a plurality of series-connected cells. For example, the high-voltage battery 111 includes a lithium-ion battery, and 88 cells each having a voltage of about 3.75 V are connected in series to output a voltage of 330 V (=3.75 V×88). For example, the high-voltage battery 111 includes a nickel hydride battery, and 84 cells each having a voltage of about 1.2 V are connected in series to output a voltage of 100.8 V (=1.2 V×84).

Each cell of the high-voltage battery 111 includes a monitoring ECU that monitors a state of the cell, and the high-voltage battery 111 supplies information obtained from the monitoring ECU of each cell as battery state information to the high-voltage battery control ECU 114. For example, the battery state information includes a voltage, a current, a temporal change in current and a temperature of the whole high-voltage battery 111 or each cell and a battery capacity (state of charge) estimated from these pieces of information.

A positive electrode of the high-voltage battery 111 is connected to the high-voltage load 102 and the DC-DC converter 112 through the relay RY1b. A negative electrode of the high-voltage battery 111 is connected to the high-voltage load 102 and the DC-DC converter 112 through the relay RY1a and also connected to a reference voltage point (for example, a body ground of the electric-powered vehicle) in the DC-DC converter 112. Accordingly, the power of the high-voltage battery 111 is supplied to the high-voltage load 102 and the DC-DC converter 112 through the relays RY1a and RY1b.

The relays RY1a to RY1b include normally open relays. Accordingly, in the relays RY1a to RY1b, a contact is opened to disconnect a high-voltage line that is a supply passage of the power from the high-voltage battery 111 to the high-voltage load 102 and the DC-DC converter 112 when a control voltage is not applied, and the contact is closed to establish the high-voltage line when the control voltage is applied. For example, the relays RY1a to RY1b include so-called high-voltage main relays attached to the electric-powered vehicle.

The DC-DC converter 112 steps down the voltage (for example, DC 334 V) of the high-voltage battery 111 to a predetermined voltage (for example, DC 14 V) and supplies the voltage to the low-voltage load 103. The DC-DC converter 112 supplies the stepped-down voltage to a power supply 121 of the high-voltage battery control ECU 114 through the backflow preventing diode D1 and the voltage adjustment circuit 113. The DC-DC converter 112 supplies the stepped-down voltage to the ECU 104 through the diode D1. That is, the power outputted from the DC-DC converter 112 is supplied to the low-voltage load 103, the high-voltage battery control ECU 114 and the ECU 104.

The DC-DC converter 112 includes an auxiliary power-supply circuit (not illustrated) therein, and obtains the power necessary for the operation by inputting the power from the high-voltage battery 111 to the auxiliary power-supply circuit.

In both ends of a cell group CG that is a part of the cells of the high-voltage battery 111 and includes at least one cell, the end on the positive electrode side is connected to the power supply 121 of the high-voltage battery control ECU 114 through the relay RY2a and the voltage adjustment circuit 113 and connected to the ECU 104 through the relay RY2b. In both the ends of the cell group CG of the high-voltage battery 111, the end on the negative electrode side is connected to the high-voltage battery control ECU 114 through the relay RY2a and the voltage adjustment circuit 113 and connected to the reference voltage point in the high-voltage battery control ECU 114. That is, the power of the cell group CG of the high-voltage battery 111 is supplied to the high-voltage battery control ECU 114 through the relays RY2a and RY2b and the voltage adjustment circuit 113 and supplied to the ECU 104 through the relay RY2b.

For example, the cell group CG includes four cells. Assuming that one cell has a voltage of 3.75 V, the voltage of 15V (=3.75 V×4) is supplied to the voltage adjustment circuit 113.

The cell group CG does not necessarily include a plurality of cells, but may include one cell.

Hereinafter, the end on the positive electrode side in both the ends of the cell group CG is referred to as a positive electrode of the cell group CG, and the end on the negative electrode side is referred to as a negative electrode of the cell group CG.

The relays RY2a to RY2b include normally closed relays. Accordingly, in the relays RY2a to RY2b, the contact is closed to establish the power supply line from the cell group CG to the high-voltage battery control ECU 114 when the control voltage is not applied, and the contact is opened to disconnect the power supply line from the cell group CG to the high-voltage battery control ECU 114 when the control voltage is applied.

For example, the voltage adjustment circuit 113 includes a regulator IC. The voltage adjustment circuit 113 converts the voltage inputted from the cell group CG of the high-voltage battery 111 and the DC-DC converter 112 into a predetermined voltage (for example, 5 V) and supplies the converted voltage to the power supply 121 of the high-voltage battery control ECU 114.

The capacitor C1 is connected in parallel between the voltage adjustment circuit 113 and the high-voltage battery control ECU 114. The capacitor C1 is charged by the power supplied from the cell group CG of the high-voltage battery 111 or the DC-DC converter 112, and the capacitor C1 is used as a backup power supply for the high-voltage battery control ECU 114 and the ECU 104. That is, the power of the capacitor C1 is supplied to the ECU 104 through the voltage adjustment circuit 113 while supplied to the high-voltage battery control ECU 114.

A capacitor device such as an electric double layer capacitor or a dischargeable and chargeable secondary battery having a small capacity may be used instead of the capacitor C1.

For example, the high-voltage battery control ECU 114 includes an MPU (Micro Processing Unit). The high-voltage battery control ECU 114 detects the abnormalities of the high-voltage battery 111 based on the battery state information supplied from the high-voltage battery 111. The high-voltage battery control ECU 114 controls the relays RY1a and RY2b to control the supply of the power from the high-voltage battery 111 to the high-voltage load 102 and the DC-DC converter 112 based on a vehicle start-up signal and a vehicle stop signal supplied from an ignition switch (not illustrated) or a start switch (not illustrated) of the electric-powered vehicle and the presence or absence of the abnormalities of the high-voltage battery 111.

The power supply 121 of the high-voltage battery control ECU 114 supplies the power, supplied from the cell group CG of the high-voltage battery 111, the DC-DC converter 112 or the capacitor C1, to each unit of the high-voltage battery control ECU 114 to operate the high-voltage battery control ECU 114. The high-voltage battery control ECU 114 controls the relays RY1a and RY2b to switch the supply source of the power operating the high-voltage battery control ECU 114.

[Configuration Example of Function of High-Voltage Battery Control ECU 114]

Figure 2:
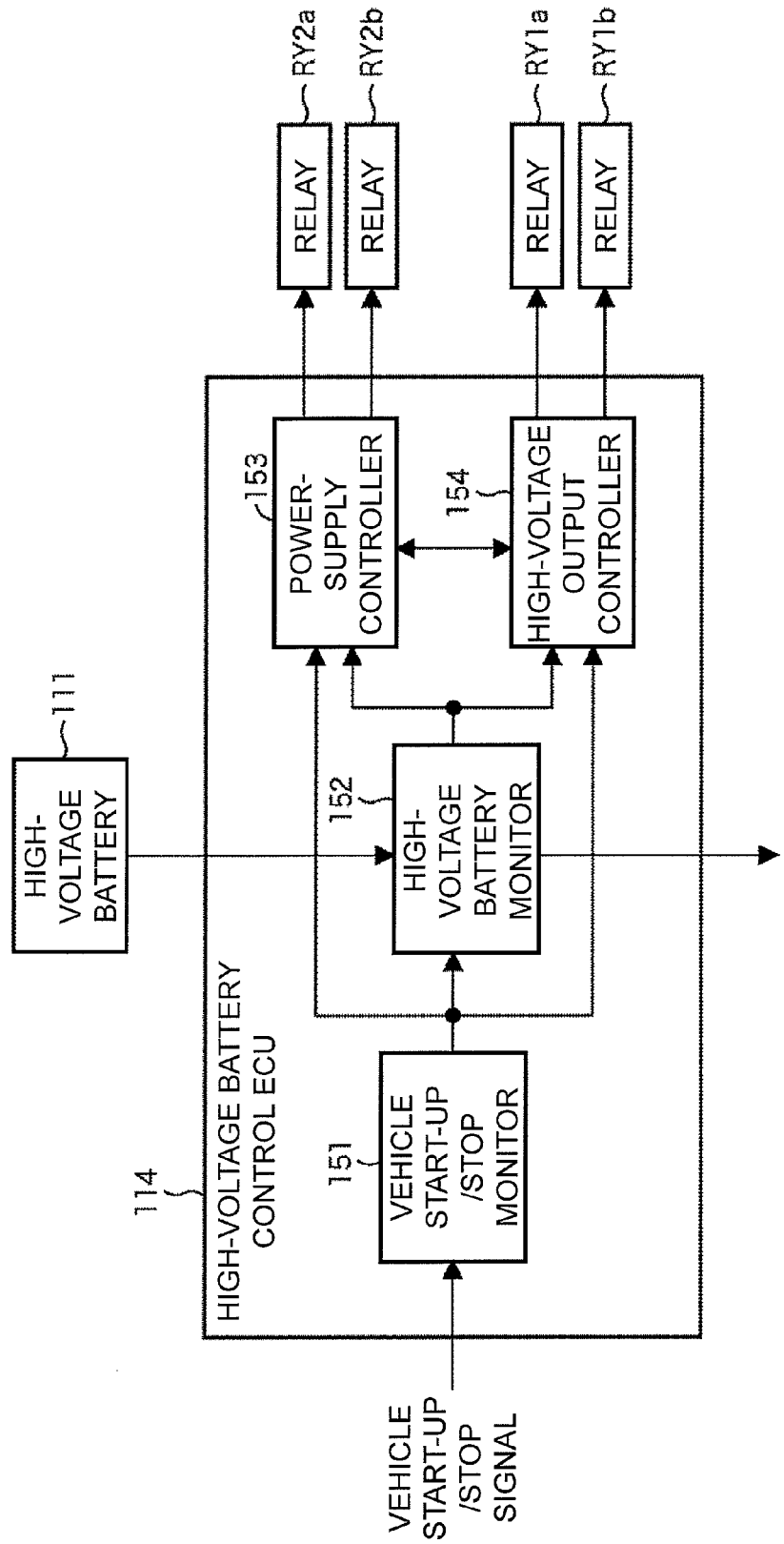
FIG. 2 is a block diagram illustrating a configuration example of a function of a high-voltage battery control ECU.

FIG. 2 is a block diagram illustrating a configuration example of a function of the high-voltage battery control ECU 114. The high-voltage battery control ECU 114 includes a vehicle start-up/stop monitor 151, a high-voltage battery monitor 152, a power-supply controller 153 and a high-voltage output controller 154.

The vehicle start-up/stop monitor 151 monitors the states of the vehicle start-up signal and vehicle stop signal, which are supplied from the ignition switch or start switch of the electric-powered vehicle. The vehicle start-up/stop monitor 151 notifies the high-voltage battery monitor 152, the power-supply controller 153 and the high-voltage output controller 154 of the state of each signal as necessary.

The vehicle start-up signal and the vehicle stop signal may be implemented by different signals or by different states of one signal (for example, one of the states is High and the other is Low).

The high-voltage battery monitor 152 detects the presence or absence of the abnormalities of the high-voltage battery 111 based on the battery state information supplied from the high-voltage battery 111. The high-voltage battery monitor 152 notifies the power-supply controller 153, the high-voltage output controller 154 and the ECU 104 of the detection result.

The power-supply controller 153 controls the relays RY2a and RY2b to control the establishment and disconnection of the power supply line from the cell group CG of the high-voltage battery 111 to the high-voltage battery control ECU 114 and the ECU 104. The power-supply controller 153 notifies the high-voltage output controller 154 of the states of the relays RY2a and RY2b as necessary.

The high-voltage output controller 154 controls the relays RY1a and RY1b to establish and disconnect the high-voltage line. The high-voltage output controller 154 notifies the power-supply controller 153 of the states of the relays RY1a and RY1b as necessary.

[Processing of Power-Supply Control System 101]

Processing of the power-supply control system 101 will be described below with reference to FIGS. 3 and 4.

First, power-supply start-up processing performed by the power-supply control system 101 will be described with reference to a flowchart of FIG. 3. For example, the power-supply start-up processing is performed when the ignition switch or start switch of the electric-powered vehicle is turned off while the power supply of the electric-powered vehicle is turned off. At this point, the relays RY2a and RY2b are closed (turned on) while the relays RY1a and RY1b are opened (turned off). Accordingly, the high-voltage line is disconnected while the power is supplied from the cell group CG of the high-voltage battery 111 to the high-voltage battery control ECU 114 and the ECU 104. The capacitor C1 is charged by the power of the cell group CG of the high-voltage battery 111.

In step S1, the high-voltage battery control ECU 114 intermittently monitors the vehicle start-up signal. Specifically, when the power supply of the electric-powered vehicle is turned off, the high-voltage battery control ECU 114 is started up with a predetermined period (for example, period of 1 ms) using the power of the cell group CG of the high-voltage battery 111. Every time the high-voltage battery control ECU 114 is started up, the vehicle start-up/stop monitor 151 detects the presence or absence of the input of the vehicle start-up signal.

The power consumption of the high-voltage battery control ECU 114 of the parked car can be suppressed by intermittently monitoring the vehicle start-up signal in this manner.

In step S2, the vehicle start-up/stop monitor 151 determines whether the vehicle start-up signal is inputted. When the vehicle start-up signal is not inputted, the flow returns to step S1. Then, in step S2, the pieces of processing in steps S1 and S2 are repeatedly performed until determination is made that the vehicle start-up signal is inputted.

On the other hand, when the ignition switch or start switch of the electric-powered vehicle is turned on to input the vehicle start-up signal to the vehicle start-up/stop monitor 151, the determination that the vehicle start-up signal is input is made in step S2, and the flow goes to step S3.

In step S3, the high-voltage battery control ECU 114 stops the intermittent operation to start the continuous operation. At this point, the high-voltage battery control ECU 114 is continuously operated by the power supplied from the cell group CG of the high-voltage battery 111.

In step S4, the high-voltage battery monitor 152 detects the state of the high-voltage battery 111 based on the battery state information supplied from the high-voltage battery 111.

In step S5, the high-voltage battery monitor 152 determines whether the high-voltage battery 111 can be used based on the result of the processing in step S4. When the state of the high-voltage battery 111 falls within a normal range, the high-voltage battery monitor 152 determines that the high-voltage battery 111 can be used, and the flow goes to step S6. At this point, the high-voltage battery monitor 152 notifies the power-supply controller 153 and the high-voltage output controller 154 that the high-voltage battery 111 can be used.

In step S6, the power-supply controller 153 opens the relays RY2a and RY2b. Therefore, the cell group CG of the high-voltage battery 111 is separated from the high-voltage battery control ECU 114 and the ECU 104 to stop the supply of the power from the cell group CG to the high-voltage battery control ECU 114 and the ECU 104. At this point, because the capacitor C1 is charged, the high-voltage battery control ECU 114 and the ECU 104 is continuously operated by the power supplied from the capacitor C1. The power-supply controller 153 notifies the high-voltage output controller 154 that the relays RY2a and RY2b are opened.

In step S7, the high-voltage output controller 154 closes the relays RY1a and RY1b. Therefore, the high-voltage line is established to start the supply of the power from the high-voltage battery 111 to the high-voltage load 102 and the DC-DC converter 112. In the high-voltage load 102, the loads except the load in which the power necessary for the operation is supplied from the DC-DC converter 112 are started up.

In step S8, the DC-DC converter 112 starts the output. That is, the DC-DC converter 112 starts the processing of stepping down the voltage of the high-voltage battery 111 to a predetermined voltage to output the voltage. Therefore, the supply of the power from the DC-DC converter 112 to the low-voltage load 103 is started to start up the low-voltage load 103, and the load in which the power necessary for the operation is supplied from the DC-DC converter 112 is started up in the high-voltage load 102 to start up the electric-powered vehicle.

The supply of the power from the DC-DC converter 112 to the ECU 104 through the diode D1 is started while the supply of the power from the DC-DC converter 112 to the high-voltage battery control ECU 114 through the diode D1 and the voltage adjustment circuit 113 is started. Therefore, the high-voltage battery control ECU 114 and the ECU 104 are operated by the power supplied from the DC-DC converter 112. The charge of the capacitor C1 is started by the power supplied from the DC-DC converter 112.

Then the power-supply start-up processing is ended.

On the other hand, when the determination that the high-voltage battery 111 cannot be used is made in step S5, the flow goes to step S9.

In step S9, the high-voltage battery monitor 152 notifies the abnormalities of the high-voltage battery 111. For example, the high-voltage battery monitor 152 notifies the ECU 104 of the abnormalities of the high-voltage battery 111, records abnormality information in a nonvolatile memory such as an EEPROM (Erasable Programmable ROM, not illustrated), and turns on an abnormality lamp (not illustrated) of an instrument panel of the electric-powered vehicle.

The relays RY2a and RY2b are closed while the relays RY1a and RY1b remain in the open state, the electric-powered vehicle is not started up, and the power-supply start-up processing is ended.

Next, power-supply stop processing performed by the power-supply control system 101 will be described with reference to a flowchart of FIG. 4. The power-supply stop processing is started, when the ignition switch or start switch of the electric-powered vehicle is turned off to input the vehicle stop signal to the vehicle start-up/stop monitor 151 in order to stop the electric-powered vehicle, or when the abnormalities of the high-voltage battery 111 are detected after the power-supply start-up processing of FIG. 3. At this point, the relays RY2a and RY2b are opened while the relays RY1a and RY1b are closed. Accordingly, the power is supplied to the high-voltage battery control ECU 114 and the ECU 104 from the DC-DC converter 112. The capacitor C1 is charged by the power supplied from the DC-DC converter 112.

In step S21, the high-voltage output controller 154 opens the relays RY1a and RY1b. Therefore, the supply of the power from the high-voltage battery 111 to the high-voltage load 102 and the DC-DC converter 112 is stopped. The supply of the power from the DC-DC converter 112 to the low-voltage load 103, the high-voltage battery control ECU 114 and the ECU 104 is stopped. At this point, because the capacitor C1 is charged, the high-voltage battery control ECU 114 and the ECU 104 is continuously operated by the power supplied from the capacitor C1. The high-voltage output controller 154 notifies the power-supply controller 153 that the relays RY1a and RY1b are opened.

In step S22, the power-supply controller 153 closes the relays RY2a and RY2b. Therefore, the supply of the power from the cell group CG of the high-voltage battery 111 to the high-voltage battery control ECU 114 and the ECU 104 is started. The charge of the capacitor C1 is started by the power supplied from the cell group CG of the high-voltage battery 111.

In step S23, the high-voltage battery control ECU 114 starts the intermittent monitoring of the vehicle start-up signal.

Then the power-supply stop processing is ended.

As described above, the power can reliably be supplied to the high-voltage battery control ECU 114 and the ECU 104 without providing the low-voltage battery, and therefore the high-voltage battery control ECU 114 and the ECU 104 can reliably be operated. As a result, for example, the presence or absence of the abnormalities of the high-voltage battery 111 can reliably be detected before starting the supply of the power from the high-voltage battery 111 to the high-voltage load 102 and the DC-DC converter 112, and the breakdowns of the high-voltage load 102 and the DC-DC converter 112 caused by the abnormalities of the high-voltage battery 111 are prevented.

Modification of First Embodiment

The capacitor C1 desirably has a capacity that can stably supply the power to the high-voltage battery control ECU 114 and the ECU 104 while the supply source of the power to the high-voltage battery control ECU 114 and the ECU 104 changes from the cell group CG of the high-voltage battery 111 to the DC-DC converter 112 or while the supply source changes from the DC-DC converter 112 to the cell group CG. However, when the capacitor C1 has the capacity that can stably supply the power to at least the high-voltage battery control ECU 114, the high-voltage line can reliably be established by continuing the operation of the high-voltage battery control ECU 114 even if the power of the ECU 104 is turned off to turn off the vehicle start-up signal.

A capacitor unit similar to that of the capacitor C1 may be provided in the ECU 104.

Since only the cell group CG in the cells of the high-voltage battery 111 is always used and discharged, desirably a countermeasure to preferentially charge the cell group CG is taken when the high-voltage battery 111 is charged by regeneration energy while the vehicle is running. Any method can be adopted as the charge amount equalizing control. The similar control may be performed during external charge while the vehicle is stopped.

In the above description, the high-voltage battery control ECU 114 (power-supply controller 153) actively closes the relays RY2a and RY2b in step S22 by way of example. Alternatively, in step S21, the relays RY2a and RY2b may wait after the relays RY1a and RY1b are opened. In such a case, after the capacitor C1 is discharged, the relays RY2a and RY2b are automatically closed by turning off the power of the high-voltage battery control ECU 114.

2. Second Embodiment

A second embodiment of the present invention will be described with reference to FIGS. 5 to 8. The capacitor C1 of the power-supply control system 101 of FIG. 1 is eliminated in the second embodiment.

[Configuration Example of Power-Supply Control System 201]

Figure 5:
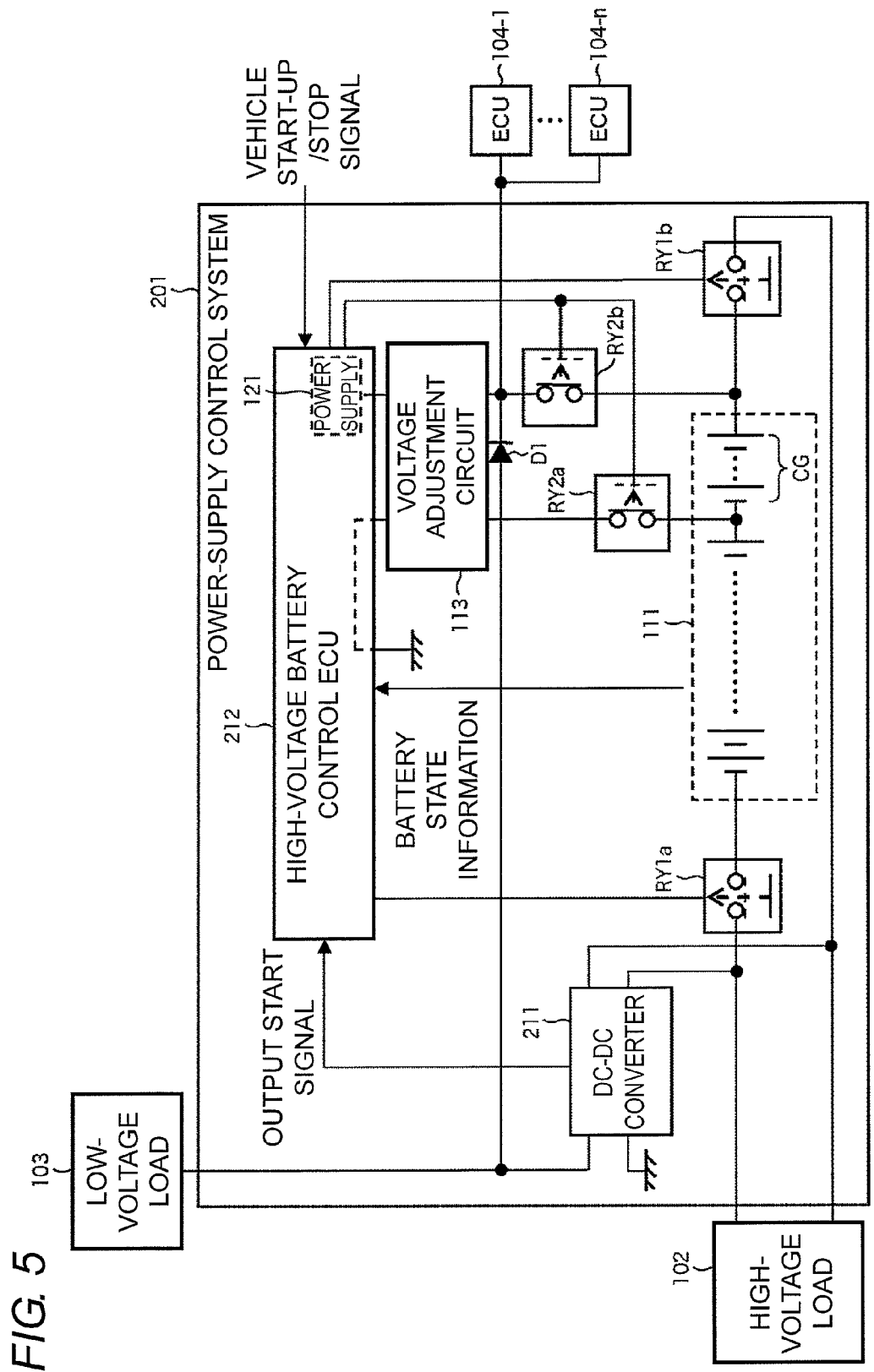
FIG. 5 is a circuit diagram illustrating a power-supply control system according to a second embodiment of the present invention.

FIG. 5 is a circuit diagram illustrating a power-supply control system of the second embodiment. In FIG. 5, the component corresponding to that of FIG. 1 is denoted by the same reference numeral, and the description of the same processing is omitted as appropriate.

A power-supply control system 201 of FIG. 5 differs from the power-supply control system 101 of FIG. 1 only in that a DC-DC converter 211 and a high-voltage battery control ECU 212 are provided instead of the DC-DC converter 112 and the high-voltage battery control ECU 114 and that the capacitor C1 is not provided.

The DC-DC converter 211 differs from the DC-DC converter 112 of FIG. 1 only in that an output start signal indicating that the output is started is supplied to the high-voltage battery control ECU 212. For example, communication between the DC-DC converter 211 and the high-voltage battery control ECU 212 is implemented by serial communication, CAN (Controller Area Network) communication or LIN (Local Interconnect Network) communication.

The high-voltage battery control ECU 212 differs from the high-voltage battery control ECU 114 of FIG. 1 only in that the supply source of the power with which the high-voltage battery control ECU 212 is operated is changed by controlling the relays RY1a to RY2b based on the output start signal of the DC-DC converter 211.

[Configuration Example of Function of High-Voltage Battery Control ECU 212]

Figure 6:
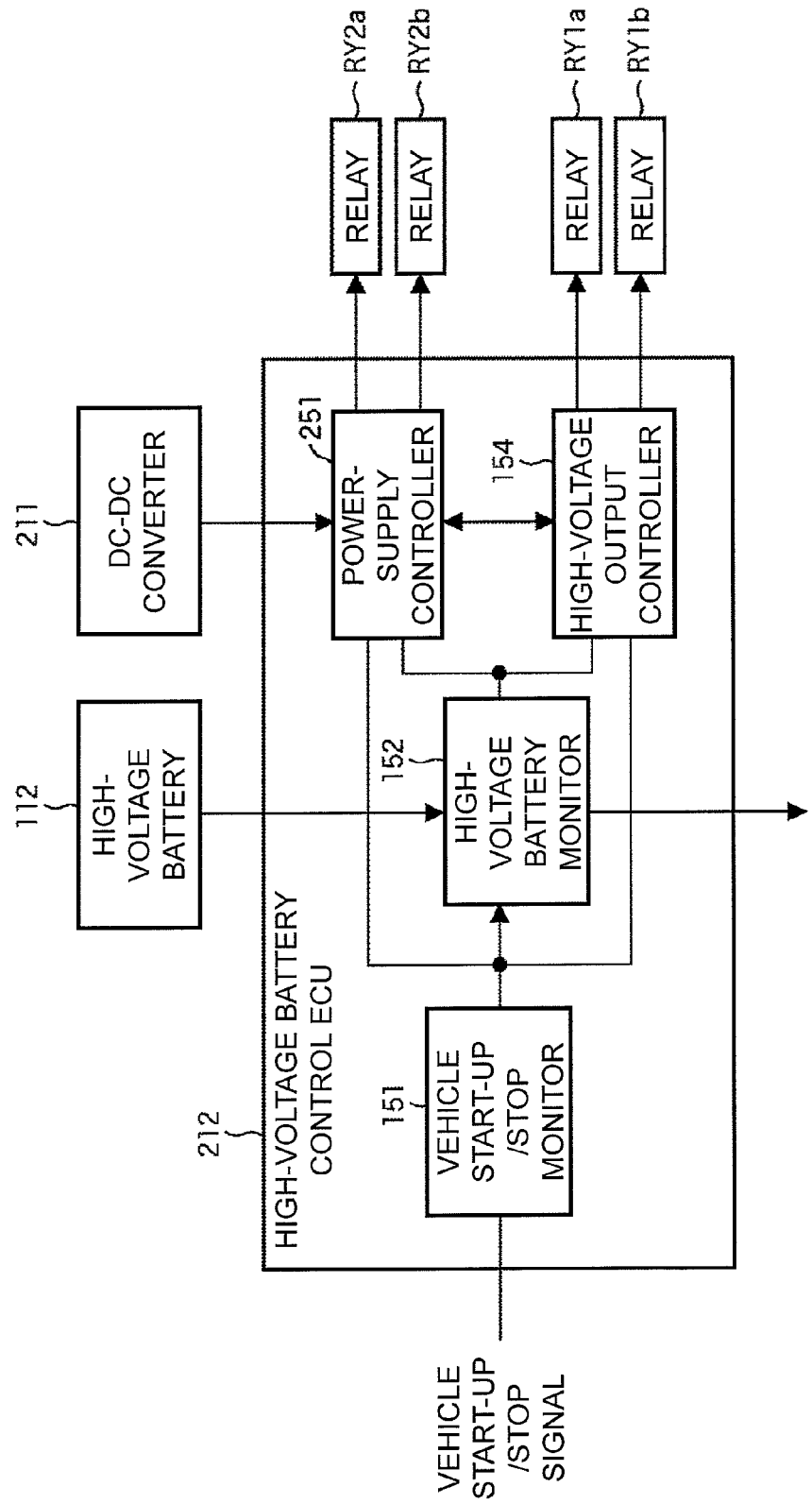
FIG. 6 is a block diagram illustrating a configuration example of a function of a high-voltage battery control ECU.

FIG. 6 is a block diagram illustrating a configuration example of a function of the high-voltage battery control ECU 212. In FIG. 6, the component corresponding to that of FIG. 2 is denoted by the same reference numeral, and the description of the same processing is omitted as appropriate.

The high-voltage battery control ECU 212 differs from the high-voltage battery control ECU 114 of FIG. 2 only in that a power-supply controller 251 is provided instead of the power-supply controller 153.

The power-supply controller 251 obtains the output start signal from the DC-DC converter 211. The power-supply controller 153 controls the relays RY2a and RY2b to control the establishment and disconnection of the power supply line from the cell group CG of the high-voltage battery 111 to the high-voltage battery control ECU 212 and the ECU 104. The power-supply controller 251 notifies the high-voltage output controller 154 of the states of the relays RY2a and RY2b as necessary.

[Processing of Power-Supply Control System 201]

Figure 7:
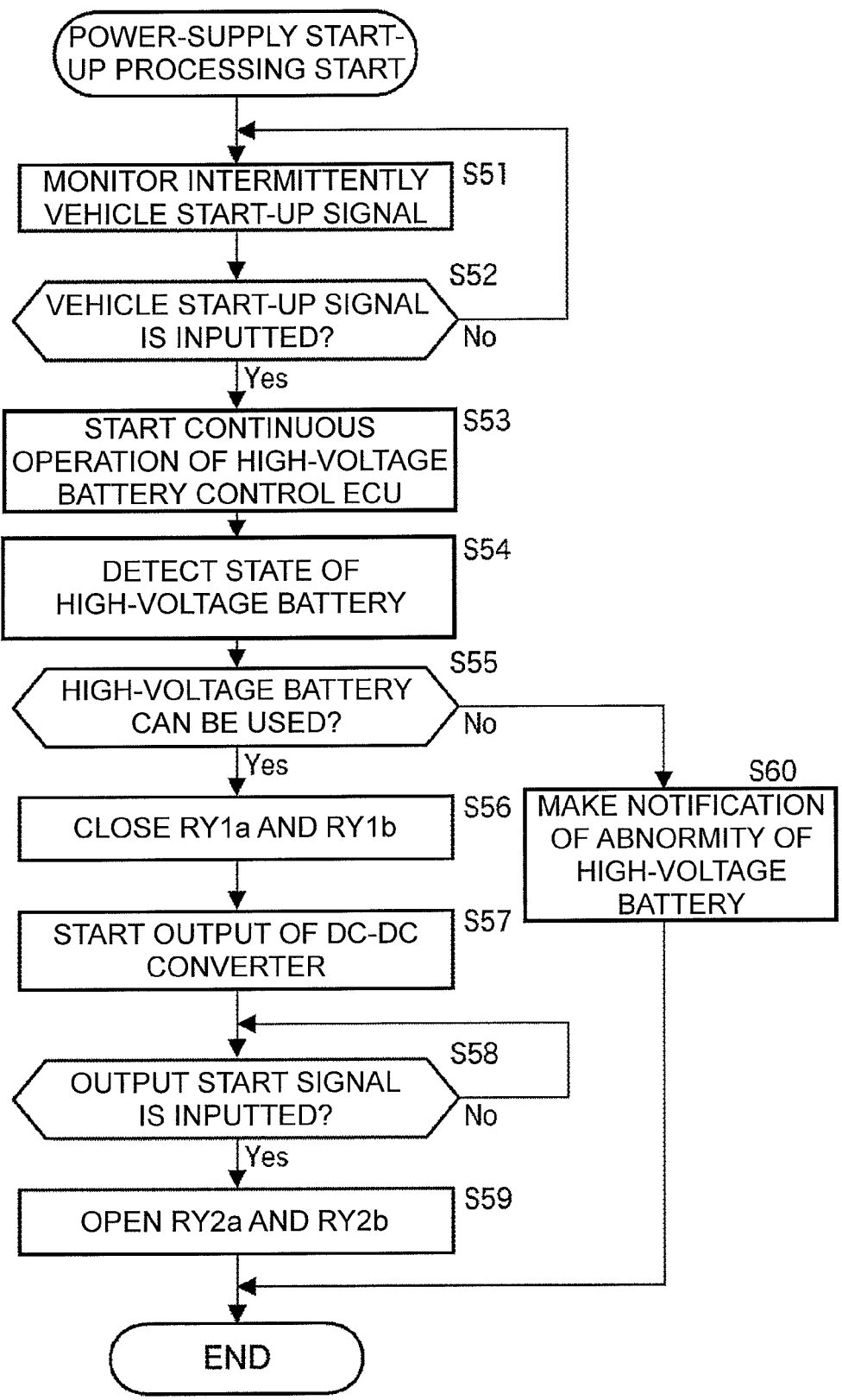
FIG. 7 is a flowchart illustrating power-supply start-up processing.
Figure 8:
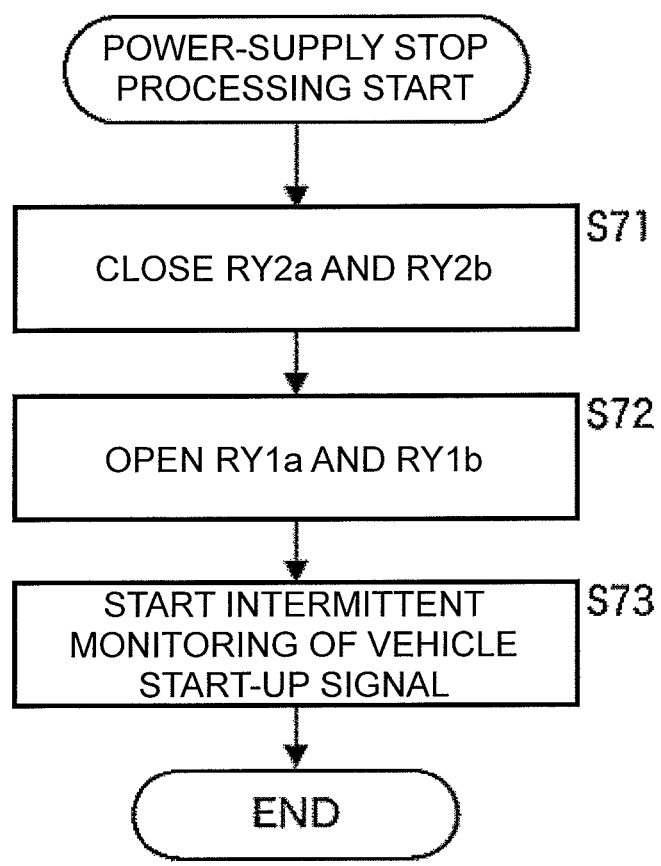
FIG. 8 is a flowchart illustrating power-supply stop processing.

Processing of the power-supply control system 201 will be described below with reference to FIGS. 7 and 8.

First, power-supply start-up processing performed by the power-supply control system 201 will be described with reference to a flowchart of FIG. 7. For example, the power-supply start-up processing is performed when the ignition switch or the start switch of the electric-powered vehicle while the power supply of the electric-powered vehicle is turned off. At this point, the relays RY2a and RY2b are closed while the relays RY1a and RY1b are opened. Accordingly, the high-voltage line is disconnected while the power is supplied from the cell group CG of the high-voltage battery 111 to the high-voltage battery control ECU 212 and the ECU 104.

Figure 3:
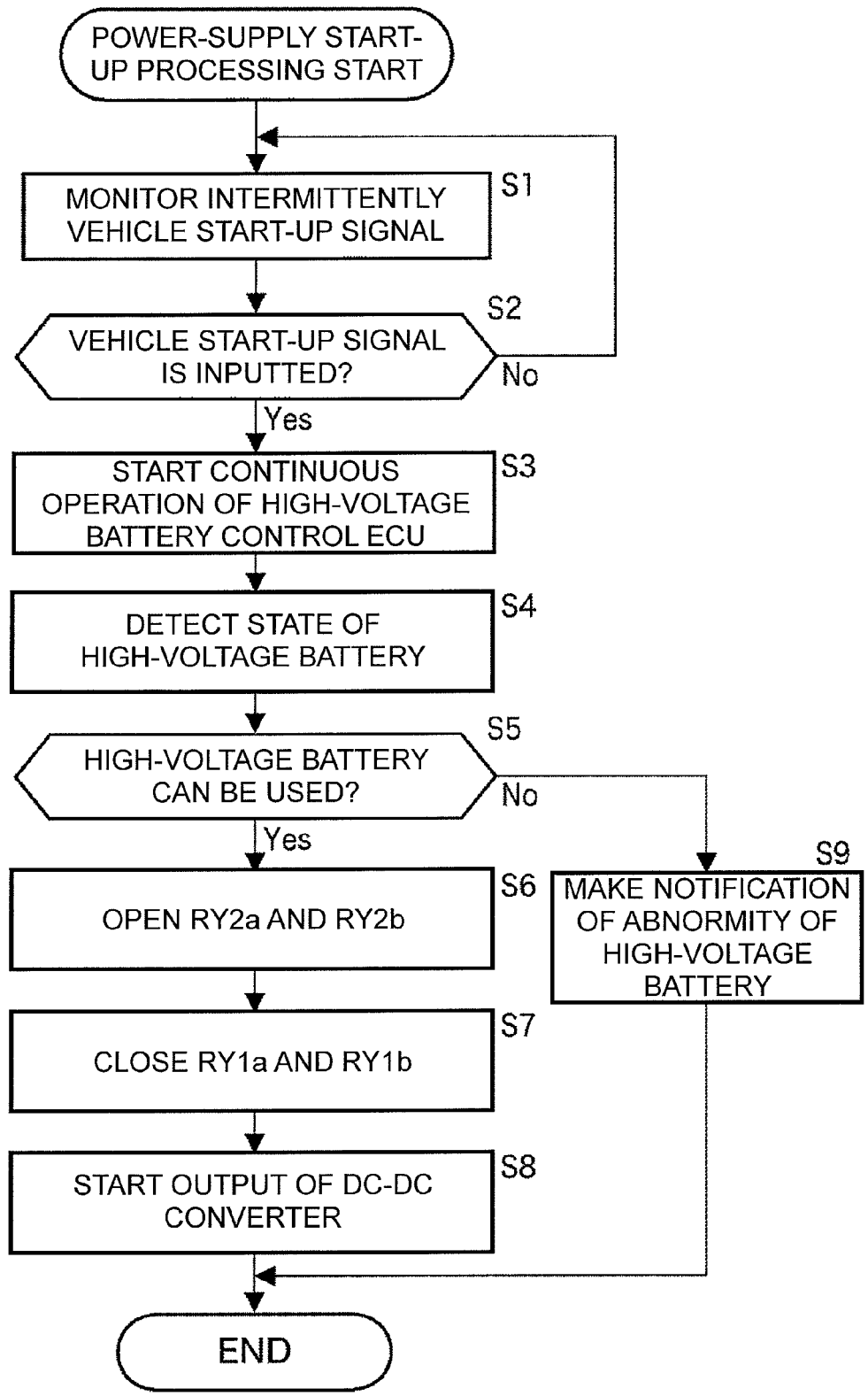
FIG. 3 is a flowchart illustrating power-supply start-up processing.

Because pieces of processing in steps S51 to S55 are similar to those in steps S1 to S5 of FIG. 3, the description thereof will not be repeated.

When the determination that the high-voltage battery 111 can be used is made in step S55, the flow goes to step S56.

In step S56, the relays RY1a and RY1b are closed similarly to the processing in step S7 of FIG. 3. Therefore, the high-voltage line is established to start the supply of the power from the high-voltage battery 111 to the high-voltage load 102 and the DC-DC converter 211. In the high-voltage load 102, the loads except the load in which the power necessary for the operation is supplied from the DC-DC converter 211 are started up.

In step S57, the DC-DC converter 211 starts the output similarly to the processing in step S8 of FIG. 3. Therefore, the supply of the power from the DC-DC converter 211 to the low-voltage load 103 is started to start up the low-voltage load 103, and the load in which the power necessary for the operation is supplied from the DC-DC converter 211 is started up in the high-voltage load 102 to start up the electric-powered vehicle.

The supply of the power from the DC-DC converter 211 to the ECU 104 through the diode D1 is started while the supply of the power from the DC-DC converter 211 to the high-voltage battery control ECU 212 through the diode D1 and the voltage adjustment circuit 113 is started. Therefore, the high-voltage battery control ECU 212 and the ECU 104 are operated by the power supplied from the DC-DC converter 211.

In step S58, the power-supply controller 251 determines whether the output start signal is inputted. The determination processing in step S58 is continued until the output start signal is inputted from the DC-DC converter 211 to the power-supply controller 251, and the flow goes to step S59 when the output start signal is inputted from the DC-DC converter 211 to the power-supply controller 251.

In step S59, the relays RY2a and RY2b are opened similarly to the processing in step S6 of FIG. 3. Therefore, the cell group CG of the high-voltage battery 111 is separated from the high-voltage battery control ECU 212 and the ECU 104 to stop the supply of the power from the cell group CG to the high-voltage battery control ECU 212 and the ECU 104. The high-voltage battery control ECU 212 and the ECU 104 are continuously operated by the power supplied from the DC-DC converter 211.

Then the power-supply start-up processing is ended.

On the other hand, when the determination that the high-voltage battery 111 cannot be used is made in step S55, the flow goes to step S60.

In step S60, the notification of the abnormality of the high-voltage battery 111 is made similarly to the processing in step S9 of FIG. 3.

The relays RY2a and RY2b are closed while the relays RY1a and RY1b remain in the open state, the electric-powered vehicle is not started up, and the power-supply start-up processing is ended.

Next, power-supply stop processing performed by the power-supply control system 201 will be described with reference to a flowchart of FIG. 8. The power-supply stop processing is started, when the ignition switch or the start switch of the electric-powered vehicle is turned off to input the vehicle stop signal to the vehicle start-up/stop monitor 151 in order to stop the electric-powered vehicle, or when the abnormalities of the high-voltage battery 111 are detected after the power-supply start-up processing of FIG. 7. At this point, the relays RY2a and RY2b are opened while the relays RY1a and RY1b are closed. Accordingly, the power is supplied to the high-voltage battery control ECU 212 and the ECU 104 from the DC-DC converter 211.

In step S71, the power-supply controller 251 closes the relays RY2a and RY2b. Therefore, the supply of the power from the cell group CG of the high-voltage battery 111 to the high-voltage battery control ECU 212 and the ECU 104 is started. The power-supply controller 251 notifies the high-voltage output controller 154 that the relays RY2a and RY2b are closed.

In step S72, the high-voltage output controller 154 opens the relays RY1a and RY1b. Therefore, the supply of the power from the high-voltage battery 111 to the high-voltage load 102 and the DC-DC converter 211 is stopped. The supply of the power from the DC-DC converter 211 to the low-voltage load 103, the high-voltage battery control ECU 212 and the ECU 104 is stopped.

Figure 4:
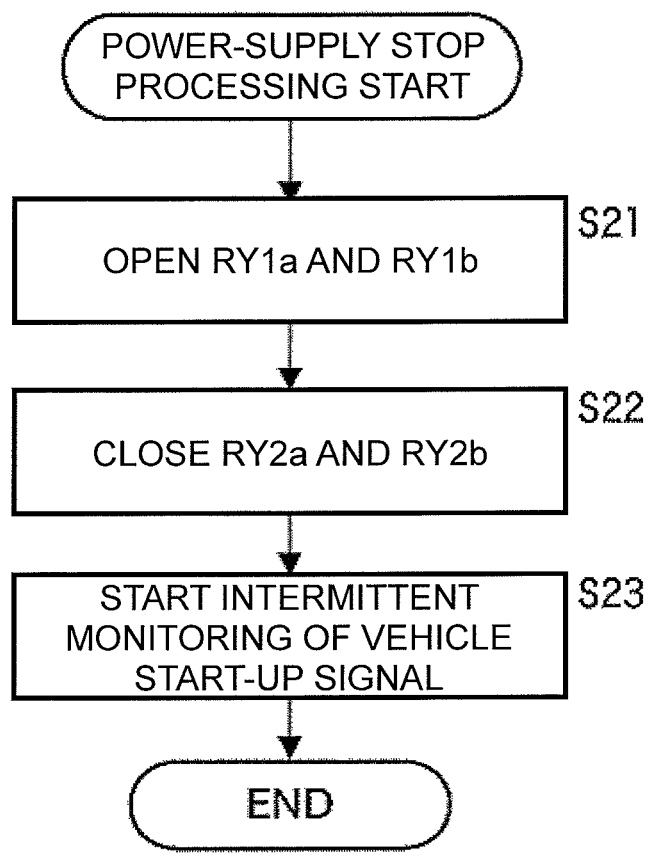
FIG. 4 is a flowchart illustrating power-supply stop processing.

In step S73, the intermittent monitoring of the vehicle start-up signal is started similarly to the processing in step S23 of FIG. 4.

Then, the power-supply stop processing is ended.

As described above, the power can always be supplied from the cell group CG of the high-voltage battery 111 or the DC-DC converter 211 to the high-voltage battery control ECU 212 and the ECU 104 without using the capacitor C1. As a result, the operations of the high-voltage battery control ECU 212 and ECU 104 can be stabilized as compared with the power-supply control system 101.

Modification of Second Embodiment

The power-supply stop processing may be performed according to the flowchart of FIG. 4. In such a case, after the relays RY1a and RY1b are opened, the relays RY2a and RY2b may automatically be closed by turning off the power of the high-voltage battery control ECU 212.

3. Third Embodiment

A third embodiment of the present invention will be described with reference to FIGS. 9 to 11.

In the first and second embodiments, in the cells of the high-voltage battery 111, the cell group CG fixedly supplies the power to each ECU (high-voltage battery control ECU 114, high-voltage battery control ECU 212 and ECU 104) by way of example. Therefore, degradation progresses earlier only in the cell group CG, a variation in charge amount is generated in the cells of the high-voltage battery 111, and performance is possibly degraded in the whole of the high-voltage battery 111.

According to one or more embodiments of the present invention, the application of the charge amount equalizing control as described above may be considered. However, it is more desirable that the power for operating each ECU is equally obtained from each cell of the high-voltage battery 111 by changing the cells that are used. In the third embodiment, the power for operating each ECU is equally obtained from each cell of the high-voltage battery 111.

[Configuration Example of Power-Supply Control System 301]

Figure 9:
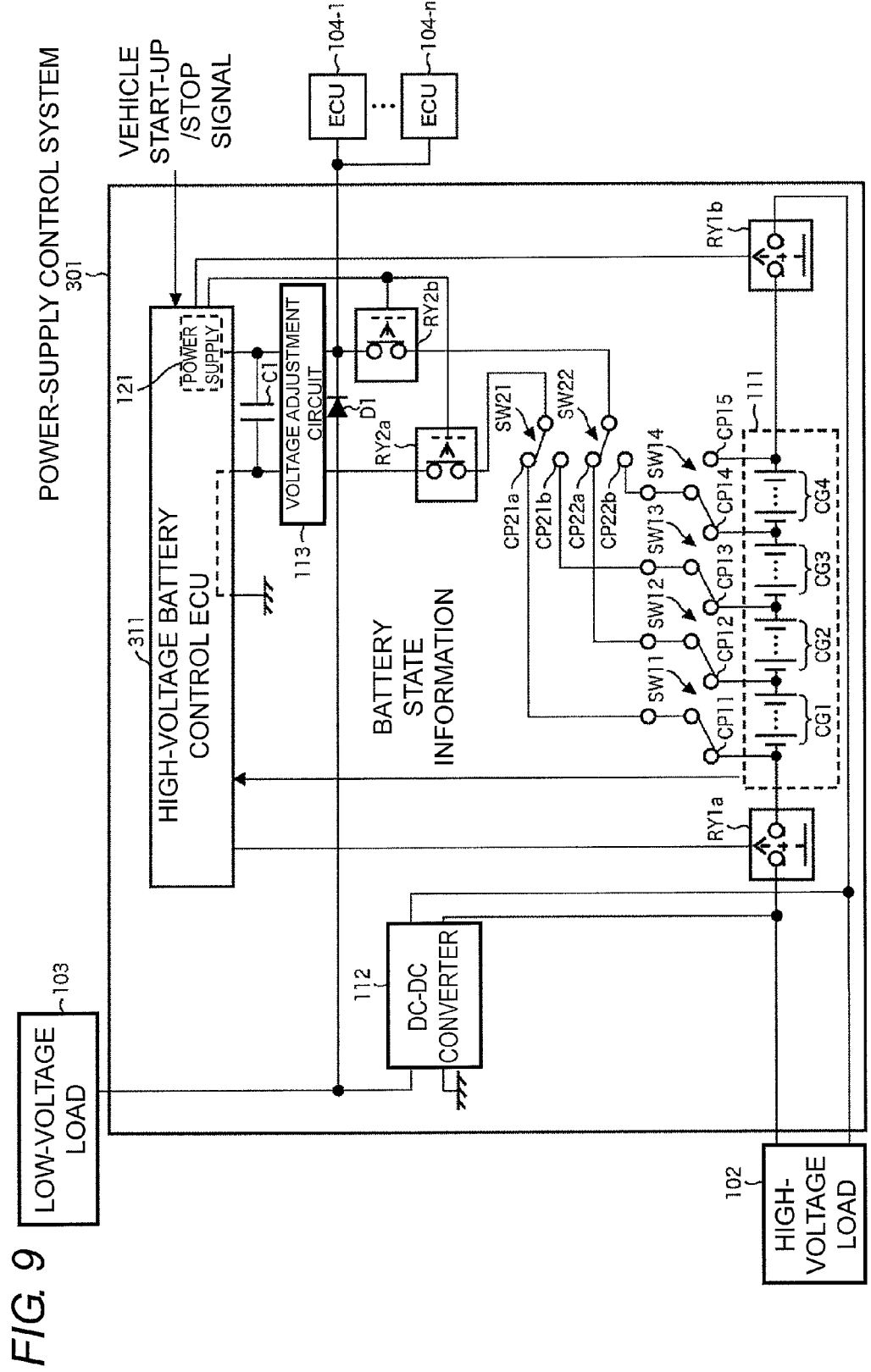
FIG. 9 is a circuit diagram illustrating a power-supply control system according to a third embodiment of the present invention.

FIG. 9 is a circuit diagram illustrating a power-supply control system of the third embodiment. In FIG. 9, the component corresponding to that of FIG. 1 is denoted by the same reference numeral, and the description of the same processing is omitted as appropriate.

A power-supply control system 301 of FIG. 9 differs from the power-supply control system 101 of FIG. 1 only in that switches SW11 to SW22 are added and that a high-voltage battery control ECU 311 is provided instead of the high-voltage battery control ECU 114.

In the power-supply control system 301, the cells of the high-voltage battery 111 are divided into four cell groups CG1 to CG4. Each of the cell groups CG1 to CG4 has the same number of series-connected cells, and the cell groups CG1 to CG4 are equal to one another in the voltage at both ends.

Hereinafter, an end on the positive electrode side in both the ends of each cell group is referred to as a positive electrode of the cell group, and an end on the negative electrode side is referred to as a negative electrode of the cell group. Hereinafter, the cell groups CG1 to CG4 are simply referred to as a cell group CG when the cell groups need not be distinguished from one another.

The switch SW11 can be connected to one of contacts CP11 and CP12. The switch SW12 can be connected to one of contacts CP12 and CP13. The switch SW13 can be connected to one of contacts CP13 and CP14. The switch SW14 can be connected to one of contacts CP14 and CP15.

The contact CP11 is connected to the negative electrode of the cell group CG1. The contact CP12 is connected to the positive electrode of the cell group CG1 and the negative electrode of the cell group CG2. The contact CP13 is connected to the positive electrode of the cell group CG2 and the negative electrode of the cell group CG3. The contact CP14 is connected to the positive electrode of the cell group CG3 and the negative electrode of the cell group CG4. The contact CP15 is connected to the positive electrode of the cell group CG4.

The switch SW21 can be connected to one of contacts CP21a and CP21b. The switch SW22 can be connected to one of contacts CP22a and CP22b.

The contact CP21a is connected to the switch SW11. The contact CP21b is connected to the switch SW13. The contact CP22a is connected to the switch SW12. The contact CP22b is connected to the switch SW14.

The high-voltage battery control ECU 311 has a function of controlling the switches SW11 to SW22 to select the cell group CG of the high-voltage battery 111 that supplies the power to each ECU in addition to the function of the high-voltage battery control ECU 114 of FIG. 1.

[Configuration Example of Function of High-Voltage Battery Control ECU 311]

Figure 10:
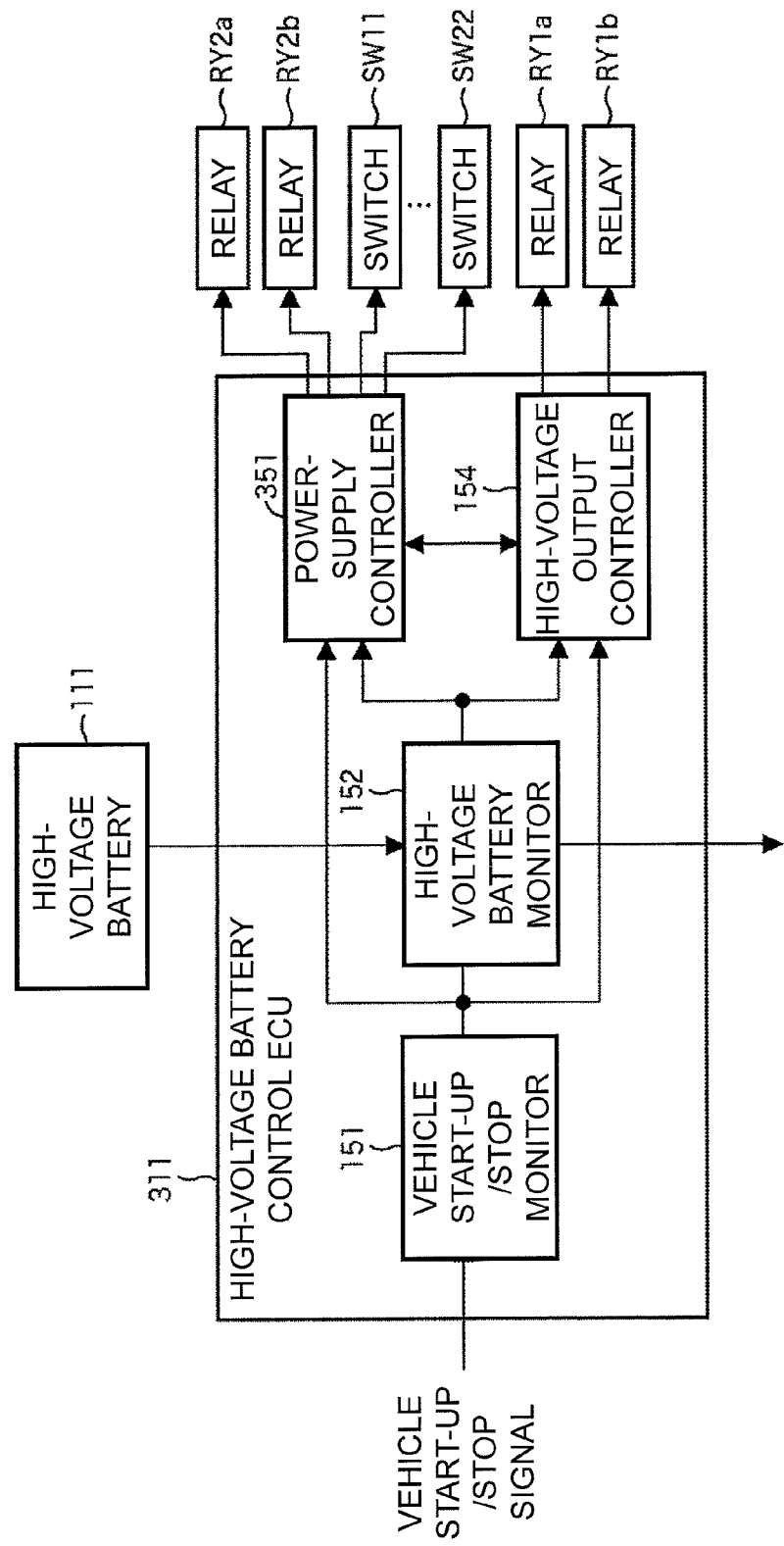
FIG. 10 is a block diagram illustrating a configuration example of a function of a high-voltage battery control ECU.
Figure 11:
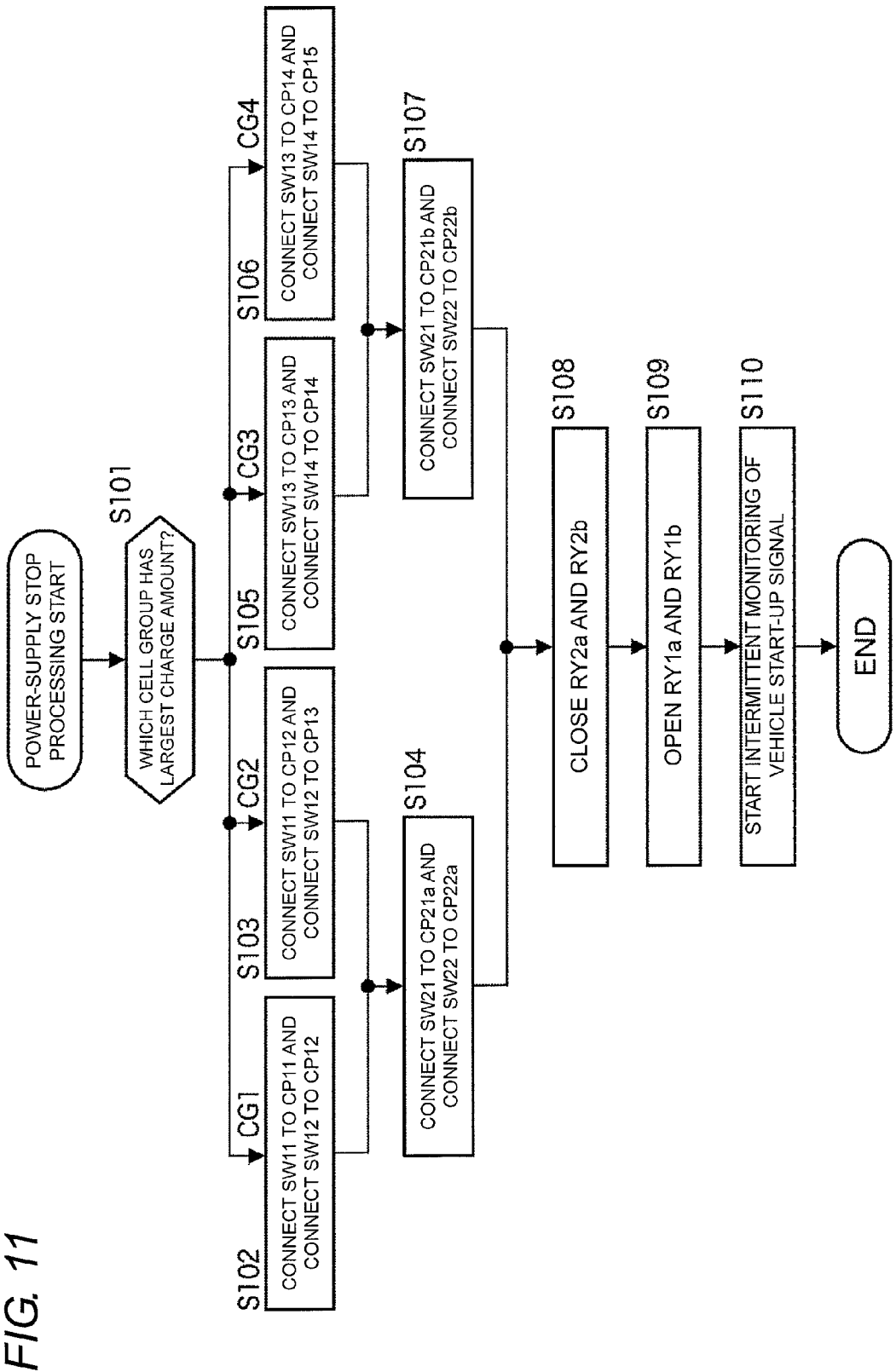
FIG. 11 is a flowchart illustrating power-supply stop processing.

FIG. 10 is a block diagram illustrating a configuration example of a function of the high-voltage battery control ECU 311. In FIG. 10, the component corresponding to that of FIG. 2 is denoted by the same reference numeral, and the description of the same processing is omitted as appropriate.

The high-voltage battery control ECU 311 differs from the high-voltage battery control ECU 114 of FIG. 2 only in that a power-supply controller 351 is provided instead of the power-supply controller 153.

The power-supply controller 351 has a function of controlling the switches SW11 to SW22 to select the cell group CG of the high-voltage battery 111 that supplies the power to each ECU in addition to the function of the power-supply controller 153 of FIG. 2.

[Processing of Power-Supply Control System 301]

Processing of the power-supply control system 301 will be described below.

Since the power-supply start-up processing performed by the power-supply control system 301 is similar to that performed by the power-supply control system 101 of FIG. 3, the description thereof will not be repeated.

Next, power-supply stop processing performed by the power-supply control system 301 will be described with reference to a flowchart of FIG. 11. The power-supply stop processing is started, when the ignition switch or start switch of the electric-powered vehicle is turned off to input the vehicle stop signal to the vehicle start-up/stop monitor 151 in order to stop the electric-powered vehicle, or when the abnormalities of the high-voltage battery 111 are detected after the power-supply start-up processing of FIG. 3. At this point, the relays RY2a and RY2b are opened while the relays RY1a and RY1b are closed. Accordingly, the power is supplied to the high-voltage battery control ECU 311 and the ECU 104 from the DC-DC converter 112. The capacitor C1 is charged by the power supplied from the DC-DC converter 112.

In step S101, the high-voltage battery monitor 152 determines which cell group CG has the largest charge amount based on the battery state information supplied from the high-voltage battery 111. When the cell group CG1 is the cell group CG having the largest charge amount, the flow goes to step S102. At this point, the high-voltage battery monitor 152 notifies the power-supply controller 351 that the cell group CG1 is the cell group CG having the largest charge amount.

In step S102, the power-supply controller 351 connects the switch SW11 to the contact CP11 and connects the switch SW12 to the contact CP12. Then the processing goes to step S104.

When the determination is made in step S101 that the cell group CG2 is the cell group CG having the largest charge amount, the flow goes to step S103. At this point, the high-voltage battery monitor 152 notifies the power-supply controller 351 that the cell group CG2 is the cell group CG having the largest charge amount.

In step S103, the power-supply controller 351 connects the switch SW11 to the contact CP12 and connects the switch SW12 to the contact CP13. Then the processing goes to step S104.

In step S104, the power-supply controller 351 connects the switch SW21 to the contact CP21a and connects the switch SW22 to the contact CP22a. Therefore, when the cell group CG1 is determined as the cell group CG having the largest charge amount, the negative electrode of the cell group CG1 is connected to the relay RY2a, and the positive electrode of the cell group CG1 is connected to the relay RY2b. On the other hand, when the cell group CG2 is determined as the cell group CG having the largest charge amount, the negative electrode of the cell group CG2 is connected to the relay RY2a, and the positive electrode of the cell group CG2 is connected to the relay RY2b. Then the processing goes to step S108.

When the determination is made in step S101 that the cell group CG3 is the cell group CG having the largest charge amount, the flow goes to step S105. At this point, the high-voltage battery monitor 152 notifies the power-supply controller 351 that the cell group CG3 is the cell group CG having the largest charge amount.

In step S105, the power-supply controller 351 connects the switch SW13 to the contact CP13 and connects the switch SW14 to the contact CP14. Then, the processing goes to step S107.

When the determination is made in step S101 that the cell group CG4 is the cell group CG having the largest charge amount, the flow goes to step S106. At this point, the high-voltage battery monitor 152 notifies the power-supply controller 351 that the cell group CG4 is the cell group CG having the largest charge amount.

In step S106, the power-supply controller 351 connects the switch SW13 to the contact CP14 and connects the switch SW14 to the contact CP15. Then, the processing goes to step S107.

In step S107, the power-supply controller 351 connects the switch SW21 to the contact CP21b and connects the switch SW22 to the contact CP22b. Therefore, when the cell group CG3 is determined as the cell group CG having the largest charge amount, the negative electrode of the cell group CG3 is connected to the relay RY2a, and the positive electrode of the cell group CG3 is connected to the relay RY2b. On the other hand, when the cell group CG4 is determined as the cell group CG having the largest charge amount, the negative electrode of the cell group CG4 is connected to the relay RY2a, and the positive electrode of the cell group CG4 is connected to the relay RY2b. Then the processing goes to step S108.

In step S108, the power-supply controller 351 closes the relays RY2a and RY2b. Therefore, the supply of the power from the cell group CG having the largest charge amount to the high-voltage battery control ECU 311 is started. The power-supply controller 351 then notifies the high-voltage output controller 154 that the relays RY2a and RY2b are closed.

In step S109, the high-voltage output controller 154 opens the relays RY1a and RY1b. Therefore, the supply of the power from the high-voltage battery 111 to the high-voltage load 102 and the DC-DC converter 112 is stopped. The supply of the power from the DC-DC converter 112 to the low-voltage load 103, the high-voltage battery control ECU 311 and the ECU 104 is stopped.

In step S110, the intermittent monitoring of the vehicle start-up signal is started similarly to the processing in step S23 of FIG. 4.

Then, the power-supply stop processing is ended.

As described above, the cell group CG having the largest charge amount is always selected as the cell group CG for supplying the power to each ECU, which allows the variation in charge amount of each cell to decrease in the high-voltage battery 111.

Modification of Third Embodiment

The selected cell group CG may be stored in the high-voltage battery control ECU 311 or the nonvolatile memory in order to decrease the variation of the cell group CG to be used. For example, when the same cell group CG is continuously selected a predetermined number of times (for example, three times), the cell group CG having the second largest charge amount may be selected next even if the continuously selected cell group CG still has the largest charge amount.

In the third embodiment, the high-voltage battery control ECU 311 controls the switches SW11 to SW22 by way of example. Alternatively, another ECU may control the switches SW11 to SW22.

For example, a transistor or a relay may be used as the switches SW11 to SW22. A three-state switch that is an open contact may be used as the switches SW21 and SW22, and the relays RY2a and RY2b may be eliminated.

The cell group CG used may automatically be rotated irrespective of the charge amount of each cell group CG, for example, in the order of the cell group CG1, the cell group CG2, the cell group CG3, the cell group CG4, the cell group CG1, and so on.

As described above, the third embodiment is applied to the first embodiment by way of example. Alternatively, the third embodiment may also be applied to the second embodiment.

In the third embodiment, the cells are divided into the four cell groups CG by way of example. Alternatively, the cells may be divided into the arbitrary number of cell groups CG according to the number of cells of the high-voltage battery 111, the input voltage of the high-voltage battery control ECU 311 and the like. It is necessary to change the number of switches according to the number of cell groups CG.

4. Fourth Embodiment

A fourth embodiment of the present invention will be described with reference to FIGS. 12 to 15.

In the fourth embodiment, the cells of the high-voltage battery 111 can equally be used compared with the third embodiment.

[Configuration Example of Power-Supply Control System 401]

Figure 12:
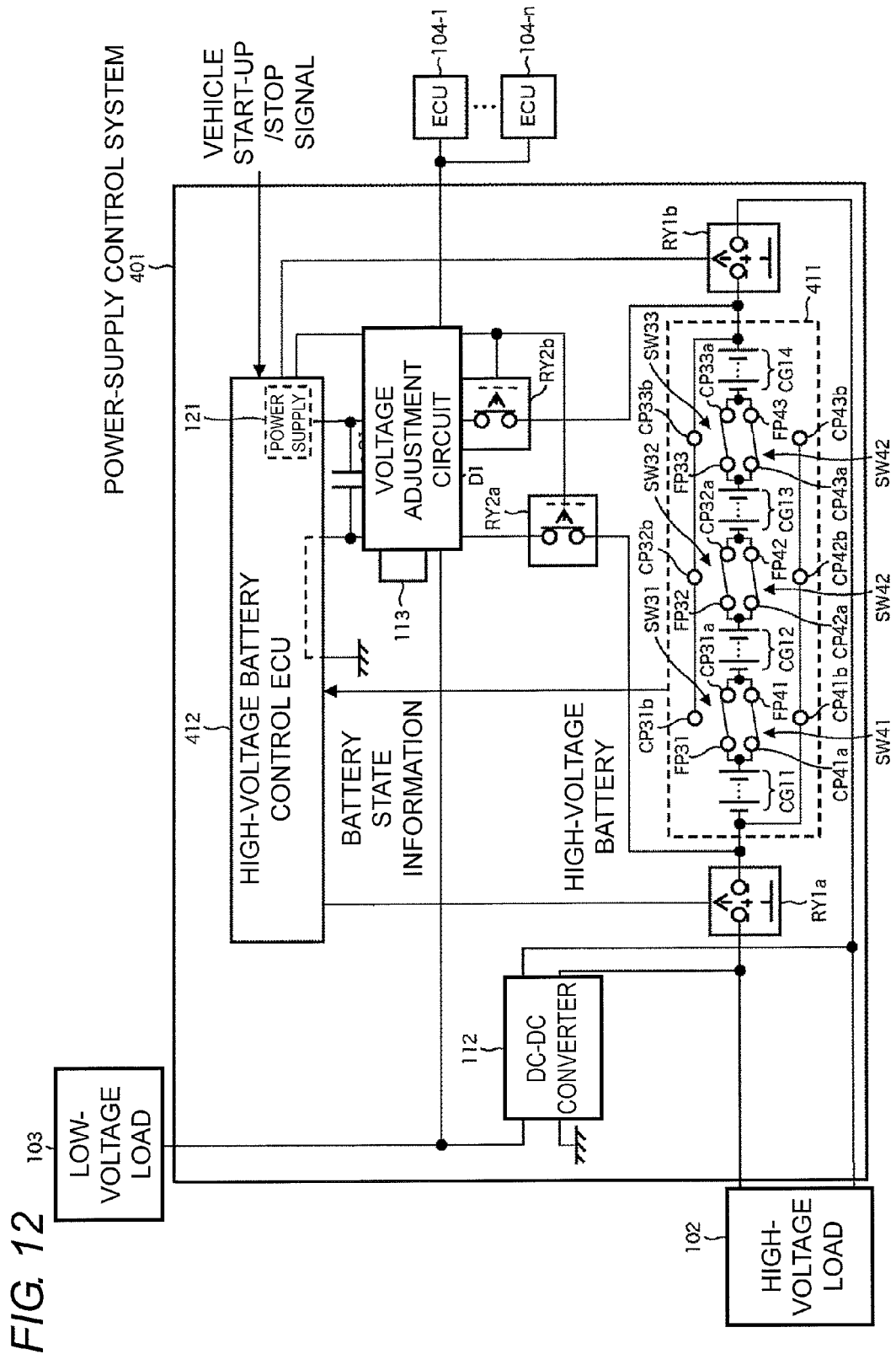
FIG. 12 is a circuit diagram illustrating a power-supply control system according to a fourth embodiment of the present invention.

FIG. 12 is a circuit diagram illustrating a power-supply control system of the fourth embodiment of the present invention. In FIG. 12, the component corresponding to that of FIG.

1 is denoted by the same reference numeral, and the description of the same processing is omitted as appropriate.

A power-supply control system 401 of FIG. 12 differs from the power-supply control system 101 of FIG. 1 only in that a high-voltage battery 411 is provided instead of the high-voltage battery 111 and that a high-voltage battery control ECU 412 is provided instead of the high-voltage battery control ECU 114.

The high-voltage battery 411 differs from the high-voltage battery 111 of FIG. 1 in that switches SW31 to SW43 are incorporated therein. Similarly to the high-voltage battery 111 of FIG. 9, the cells of the high-voltage battery 411 are divided into four cell groups CG11 to CG14. Hereinafter, the cell groups CG11 to CG14 are simply referred to as a cell group CG when the cell groups need not be distinguished from one another.

A supporting point FP31 of the switch SW31 is connected to the positive electrode of the cell group CG11, a contact CP31a is connected to the negative electrode of the cell group CG12, and a contact CP31b is connected to a contact CP32b of the switch SW32. A supporting point FP32 of the switch SW32 is connected to the positive electrode of the cell group CG12, a contact CP32a is connected to the negative electrode of the cell group CG13, and a contact CP32b is connected to a contact CP33b of the switch SW33. A supporting point FP33 of the switch SW33 is connected to the positive electrode of the cell group CG13, a contact CP33a is connected to the negative electrode of the cell group CG14, and a contact CP33b is connected to the positive electrode of the cell group CG14.

A supporting point FP41 of the switch SW41 is connected to the negative electrode of the cell group CG12, a contact CP41a is connected to the positive electrode of the cell group CG11, and a contact CP41b is connected to the negative electrode of the cell group CG11. A supporting point FP42 of the switch SW42 is connected to the negative electrode of the cell group CG13, a contact CP42a is connected to the positive electrode of the cell group CG12, and a contact CP42b is connected to a contact CP41b of the switch SW41. A supporting point FP43 of the switch SW43 is connected to the negative electrode of the cell group CG14, a contact CP43a is connected to the positive electrode of the cell group CG13, and a contact CP43b is connected to a contact CP42b of the switch SW42.

Accordingly, the switches SW31 to SW33 are connected to the contacts CP31a to CP33a, and the switches SW41 to SW43 are connected to the contacts CP41a to CP43a, whereby the cell groups CG11 to CG14 of the high-voltage battery 411 are connected in series. On the other hand, the switches SW31 to SW33 are connected to the contacts CP31b to CP33b, and the switches SW41 to SW43 are connected to the contacts CP41b to CP43b, whereby the cell groups CG11 to CG14 of the high-voltage battery 411 are connected in parallel.

The high-voltage battery control ECU 412 has a function of controlling the switches SW31 to SW43 to change the series connection or the parallel connection of the cell group CG of the high-voltage battery 411 in addition to the function of the high-voltage battery control ECU 114 of FIG. 1.

[Configuration Example of Function of High-Voltage Battery Control ECU 412]

Figure 13:
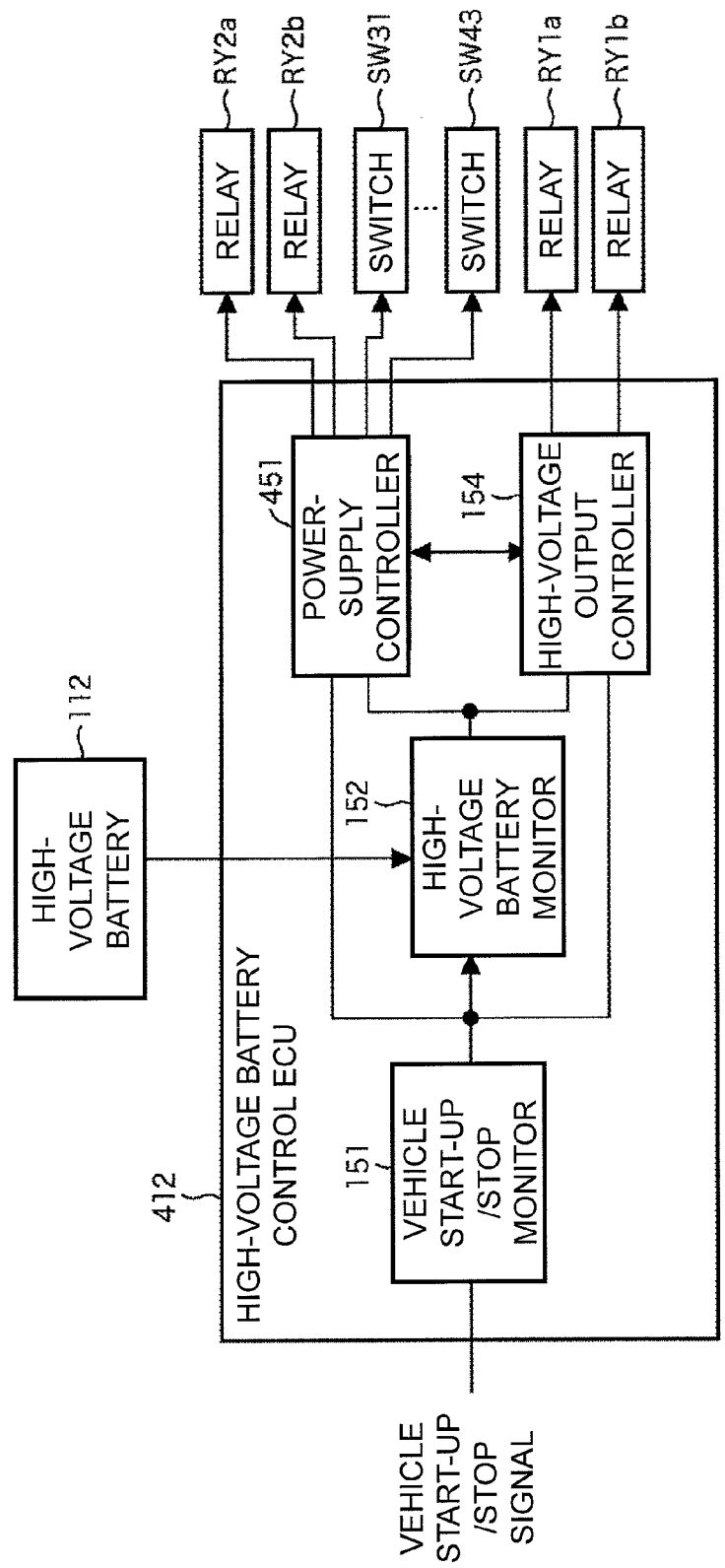
FIG. 13 is a block diagram illustrating a configuration example of a function of a high-voltage battery control ECU.

FIG. 13 is a block diagram illustrating a configuration example of a function of the high-voltage battery control ECU 412. In FIG. 13, the component corresponding to that of FIG. 2 is denoted by the same reference numeral, and the description of the same processing is omitted as appropriate.

The high-voltage battery control ECU 412 differs from the high-voltage battery control ECU 114 of FIG. 2 in that a power-supply controller 451 is provided instead of the power-supply controller 153.

The power-supply controller 451 has a function of controlling the switches SW31 to SW43 to change the series connection or the parallel connection of the cell group CG of the high-voltage battery 411 in addition to the function of power-supply controller 153 of FIG. 2.

[Processing of Power-Supply Control System 401]

Figure 14:
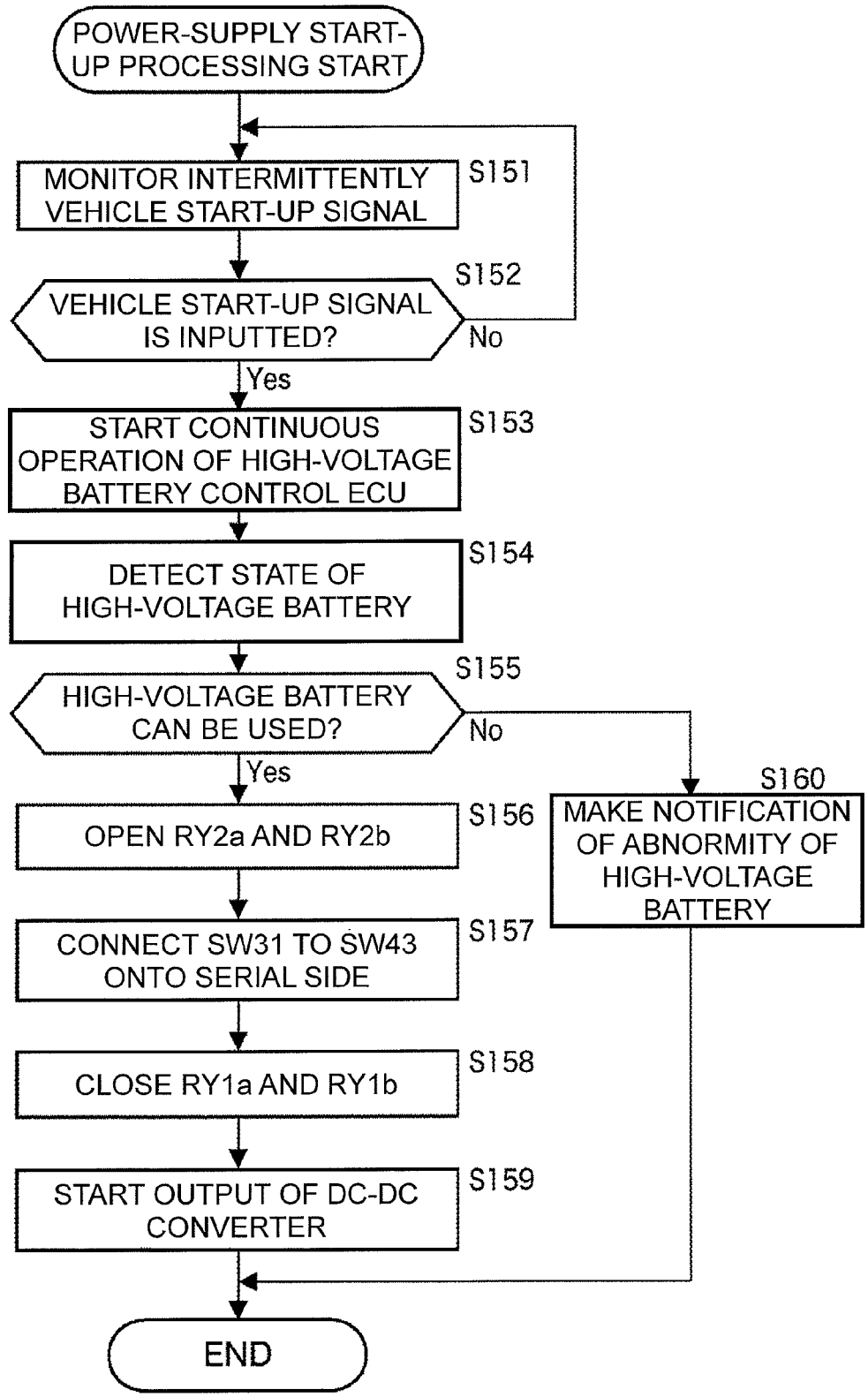
FIG. 14 is a flowchart illustrating power-supply start-up processing.
Figure 15:
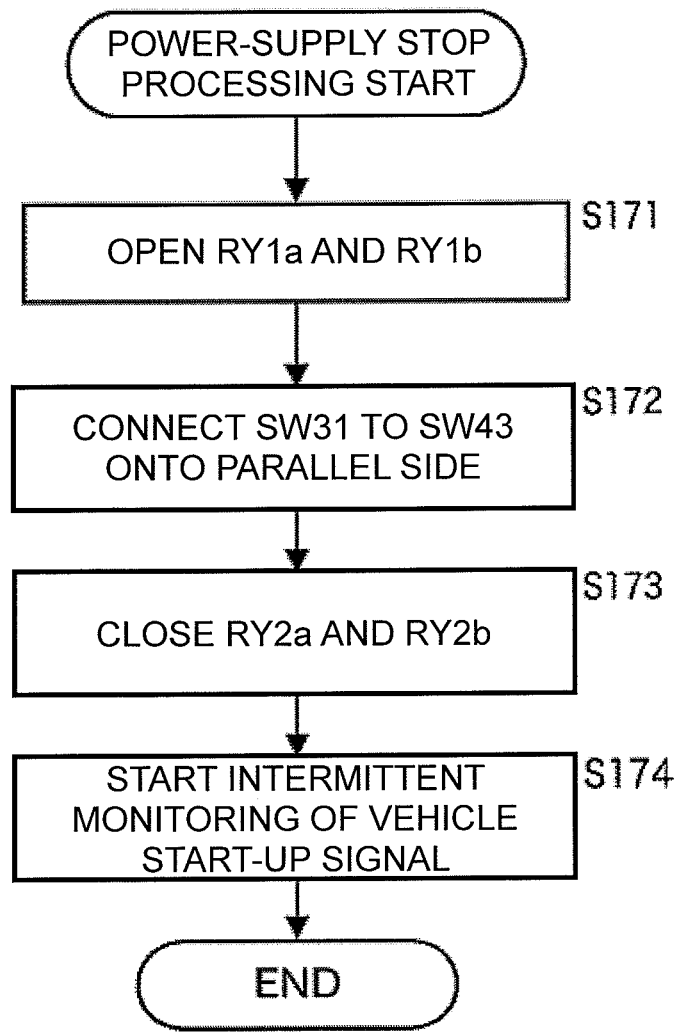
FIG. 15 is a flowchart illustrating power-supply stop processing.

Processing of the power-supply control system 401 will be described below with reference to FIGS. 14 and 15.

First, power-supply start-up processing performed by the power-supply control system 401 will be described with reference to a flowchart of FIG. 14. For example, the power-supply start-up processing is performed when the ignition switch or start switch of the electric-powered vehicle is turned off while the power supply of the electric-powered vehicle is turned off. At this point, the relays RY2a and RY2b are closed, the relays RY1a and RY1b are opened, the switches SW31 to SW33 are connected to the contacts CP31b to CP33b, and the switches SW41 to SW43 are connected to the contacts CP41b to CP43b. Accordingly, the high-voltage line is disconnected while the power is supplied from the parallel-connected cell groups CG11 to CG14 to the high-voltage battery control ECU 412 and the ECU 104. The capacitor C1 is charged by the power of the parallel-connected cell groups CG11 to CG14.

Since pieces of processing in steps S151 to S155 are similar to those in steps S1 to S5 of FIG. 3, the description thereof will not be repeated.

When the determination is made in step S155 that the high-voltage battery 411 can be used, the flow goes to step S156.

In step S156, the relays RY2a and RY2b are opened similarly to the processing in step S6 of FIG. 3. Therefore, the cell groups CG11 to CG14 of the high-voltage battery 411 are separated from the high-voltage battery control ECU 412 and the ECU 104 to stop the supply of the power from the cell groups CG11 to CG14 to the high-voltage battery control ECU 412 and the ECU 104. At this point, because the capacitor C1 is charged, the high-voltage battery control ECU 412 and the ECU 104 are continuously operated by the power supplied from the capacitor C1.

In step S157, the power-supply controller 451 connects the switches SW31 to SW43 onto the series connection side. That is, the power-supply controller 451 connects the switches SW31 to SW33 to the contacts CP31a to CP33a and connects the switches SW41 to SW43 to the contacts CP41a to CP43a. Therefore, the cell groups CG11 to CG14 are connected in series. The power-supply controller 153 notifies the high-voltage output controller 154 that the relays RY2a and RY2b are opened.

At this point, the relays RY1a and RY1b are opened, and the high-voltage line is not established. Therefore, it is not always necessary to match the control timing in the switches SW31 to SW43.

In step S158, the relays RY1a and RY1b are closed similarly to the processing in step S7 of FIG. 3. Therefore, the high-voltage line is established to start the supply of the power from the high-voltage battery 411 in which the cell groups CG11 to CG14 are connected in series to the high-voltage load 102 and the DC-DC converter 112.

In step S159, the DC-DC converter 112 starts the output similarly to the processing in step S8 of FIG. 3.

Then, the power-supply start-up processing is ended.

On the other hand, when the determination is made in step S155 that the high-voltage battery 411 cannot be used, the flow goes to step S160.

In step S160, the notification of the abnormalities of the high-voltage battery 411 is made similarly to the processing in step S9 of FIG. 3.

The relays RY2a and RY2b are closed while the relays RY1a and RY1b remain in the open state, the electric-powered vehicle is not started up, and the power-supply start-up processing is ended.

Next, power-supply stop processing performed by the power-supply control system 401 will be described with reference to a flowchart of FIG. 15. The power-supply stop processing is started, when the ignition switch or start switch of the electric-powered vehicle is turned off to input the vehicle stop signal to the vehicle start-up/stop monitor 151 in order to stop the electric-powered vehicle, or when the abnormalities of the high-voltage battery 411 are detected after the power-supply start-up processing of FIG. 14. At this point, the relays RY2a and RY2b are opened, the relays RY1a and RY1b are closed, the switches SW31 to SW33 are connected to the contacts CP31a to CP33a, and the switches SW41 to SW43 are connected to the contacts CP41a to CP43a. Accordingly, the power is supplied to the high-voltage battery control ECU 412 and the ECU 104 from the DC-DC converter 112. Further, the capacitor C1 is charged by the power supplied from the DC-DC converter 112. The cell groups CG11 to CG14 of the high-voltage battery 411 are connected in series.

In step S171, the relays RY1a and RY1b are opened similarly to the processing in step S21 of FIG. 4.

In step S172, the power-supply controller 451 connects the switches SW31 to SW43 onto the parallel connection side. That is, the power-supply controller 451 connects the switches SW31 to SW33 to the contacts CP31b to CP33b and connects the switches SW41 to SW43 to the contacts CP41b to CP43b. Therefore, the cell groups CG11 to CG14 of the high-voltage battery 411 are connected in series.

In step S173, the relays RY2a and RY2b are closed similarly to the processing in step S22 of FIG. 4. Therefore, the supply of the power from the parallel-connected cell groups CG11 to CG14 of the high-voltage battery 411 to the high-voltage battery control ECU 412 and the ECU 104 is started. The charge of the capacitor C1 is started by the power supplied from the parallel-connected cell groups CG11 to CG14 of the high-voltage battery 411.

In step S174, the intermittent monitoring of the vehicle start-up signal is started similarly to the processing in step S23 of FIG. 4.

As described above, the cells of the high-voltage battery 411 can equally be used to further decrease the variation in charge amount of each cell.

Modification of Fourth Embodiment

In the fourth embodiment, the cells are divided into the four cell groups CG by way of example. Alternatively, the cells may be divided into the arbitrary number of cell groups CG according to the number of cells of the high-voltage battery 411, the input voltage of the high-voltage battery control ECU 412 and the like. It is necessary to change the number of switches according to the number of cell groups CG.

After the relays RY1a and RY1b are opened, the capacitor C1 is discharged, and the relays RY2a and RY2b may automatically be closed by turning off the power of the high-voltage battery control ECU 412. In this case, before the relays RY2a and RY2b are closed, it is necessary that the switches SW31 to SW43 are connected onto the parallel connection side such that high-voltage power is not applied to the high-voltage battery control ECU 412 and the ECU 104.

5. Modifications of Embodiments

In the above embodiments, the low-voltage battery is eliminated. Similarly to the conventional configuration, the low-voltage battery is provided in the stage subsequent to the DC-DC converter, and the power may be supplied from the low-voltage battery to the low-voltage load and each ECU. In this case, when the low-voltage battery has run out, a double power supply system in which the power is supplied from some cell groups CG of the high-voltage battery to each ECU can be configured as described above.

In the above embodiments, by way of example, the monitoring ECU is provided in each cell of the high-voltage battery to supply the battery state information from the high-voltage battery to the high-voltage battery control ECU. Alternatively, the high-voltage battery control ECU may detect the state of each cell of the high-voltage battery.

The above-described sequence of pieces of processing may be performed by either hardware or software. When the pieces of processing are performed by software, a program constituting the software is installed in a computer. Examples of the computer include a computer such as the high-voltage battery control ECU which is incorporated in the dedicated hardware and a general-purpose personal computer that can perform various functions by installing various programs.

A program executed by the computer may be a program in which the pieces of processing are performed in time series in the order described herein or a program in which the pieces of processing are performed in parallel or at necessary timing such as invoking.

In the above embodiments, a system means the whole apparatus including a plurality of devices.

The present invention is not limited to the above embodiments, but various changes can be made without departing from the scope of the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A power-supply control device for a battery having a plurality of cells connected in series comprising:
   a voltage conversion unit that steps down a voltage at the battery to supply the stepped-down voltage to a first load;
   a first opening and closing unit that opens and closes a supply path of first power from the battery to the voltage conversion unit and a second load;
   a battery control unit that detects abnormality of the battery, controls opening and closing of the first opening and closing unit, and is operated by second power supplied from the battery or third power supplied from the voltage conversion unit, the second power being lower than the first power; and
   a second opening and closing unit that opens and closes a supply path of the second power from the battery to the battery control unit, wherein
   the battery control unit controls opening and closing of the second opening and closing unit, the battery control unit opens the first opening and closing unit and detects the abnormality of the battery while closing the second opening and closing unit when the supply of the first power from the battery to the voltage conversion unit and the second load is started, the battery control unit closes the first opening and closing unit while opening the second opening and closing unit when the abnormality of the battery is not detected, and the battery control unit continuously opens the first opening and closing unit when the abnormality of the battery is detected.

2. The power-supply control device according to claim 1, wherein the second power is supplied from some of the cells of the battery.

3. The power-supply control device according to claim 2, further comprising a changing unit that changes the cells of the battery, the cell supplying the second power.

4. The power-supply control device according to claim 1, further comprising a capacitor unit that is located between the second opening and closing unit and the battery control unit and charged by the second power, wherein in starting the supply of the first power from the battery to the voltage conversion unit and the second load, the battery control unit opens the second opening and closing unit to close the first opening and closing unit when the abnormality of the battery is not detected.

5. The power-supply control device according to claim 4, wherein the battery includes a plurality of cell groups having the same number of series-connected cells, the power-supply control device further includes a changing unit that changes series connection and parallel connection among the plurality of cell groups, and the second power is supplied from the plurality of parallel-connected cell groups.

6. The power-supply control device according to claim 1, wherein, in starting the supply of the first power from the battery to the voltage conversion unit and the second load, when the abnormality of the battery is not detected, the battery control unit closes the first opening and closing unit, and the battery control unit opens the second opening and closing unit after a signal indicating start of the supply of the third power is supplied from the voltage conversion unit.

* * * * *